US012786825B2

(12) United States Patent
Jun et al.

(10) Patent No.: US 12,786,825 B2
(45) Date of Patent: Nov. 3, 2026

(54) METHOD AND APPARATUS FOR MANAGING RADIO BEARER IN MULTI-RADIO MULTI-CONNECTIVITY

(71) Applicant: ELECTRONICS AND TELECOMMUNICATIONS RESEARCH INSTITUTE, Daejeon (KR)

(72) Inventors: Sun Mi Jun, Daejeon (KR); Il Gyu Kim, Daejeon (KR); Jung Im Kim, Daejeon (KR); Jun Sik Kim, Daejeon (KR); Soongi Park, Daejeon (KR); Sung Cheol Chang, Daejeon (KR); Hee Sang Chung, Daejeon (KR); Yong Seouk Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 294 days.

(21) Appl. No.: 18/539,106

(22) Filed: Dec. 13, 2023

(65) Prior Publication Data

US 2024/0196287 A1 Jun. 13, 2024

(30) Foreign Application Priority Data

Dec. 13, 2022 (KR) ........................ 10-2022-0174048

(51) Int. Cl.

| | |
|---|---|
| ***H04W 36/06*** | (2009.01) |
| ***H04W 36/30*** | (2009.01) |
| ***H04W 76/19*** | (2018.01) |
| ***H04W 76/20*** | (2018.01) |

(52) U.S. Cl.

CPC ........... *H04W 36/06* (2013.01); *H04W 36/30* (2013.01); *H04W 76/19* (2018.02); *H04W 76/20* (2018.02)

(58) Field of Classification Search

CPC ..... H04W 36/06; H04W 36/30; H04W 76/19; H04W 76/20; H04W 76/15; H04W 28/0864; H04W 28/0263; H04W 28/0268; H04W 76/22

See application file for complete search history.

(56) References Cited

U.S. PATENT DOCUMENTS

| | | | | |
|---|---|---|---|---|
| 10,149,199 | B2 | 12/2018 | Hong | |
| 10,512,116 | B2 | 12/2019 | Chang et al. | |
| 10,536,986 | B2 | 1/2020 | Kim | |
| 10,855,396 | B2 | 12/2020 | Zhou et al. | |
| 2015/0043492 | A1 | 2/2015 | Baek et al. | |
| 2016/0057802 | A1* | 2/2016 | Lee | H04W 76/19 370/329 |
| 2018/0213456 | A1* | 7/2018 | Jheng | H04W 28/0273 |
| 2020/0120736 | A1 | 4/2020 | Xu et al. | |

(Continued)

FOREIGN PATENT DOCUMENTS

| | | | |
|---|---|---|---|
| KR | 10-2021-0009176 | A | 1/2021 |
| WO | 2019/216612 | A1 | 11/2019 |

*Primary Examiner* — Sun Jong Kim

(57) ABSTRACT

Disclosed are radio bearer management method and apparatus for multi-radio multi-connectivity. A method of a terminal may comprise: transmitting UP data to at least one node among an MN or SN through a first DRB; and in response to identifying a UL coverage loss in the second SN, determining switching from the first DRB to a second DRB based on a bearer switching rule.

12 Claims, 13 Drawing Sheets

(56) References Cited

U.S. PATENT DOCUMENTS

| | | | | |
|---|---|---|---|---|
| 2020/0245401 | A1* | 7/2020 | Ingale | H04W 28/06 |
| 2022/0086947 | A1 | 3/2022 | Pelletier et al. | |
| 2022/0095161 | A1* | 3/2022 | Kim | H04W 12/033 |
| 2022/0329982 | A1 | 10/2022 | Kim et al. | |
| 2023/0053069 | A1 | 2/2023 | Ohlsson et al. | |
| 2023/0053835 | A1 | 2/2023 | Byun et al. | |
| 2023/0363026 | A1* | 11/2023 | Futaki | H04W 76/15 |

* cited by examiner

METHOD AND APPARATUS FOR MANAGING RADIO BEARER IN MULTI-RADIO MULTI-CONNECTIVITY

CROSS-REFERENCE TO RELATED APPLICATIONS

This application claims priority to Korean Patent Application No. 10-2022-0174048, filed on Dec. 13, 2022, with the Korean Intellectual Property Office (KIPO), the entire contents of which are hereby incorporated by reference.

BACKGROUND

1. Technical Field

The present disclosure relates to a technique for multi-connectivity, and more specifically, to a technique for managing radio bearers in multi-radio multi-connectivity.

2. Related Art

The sub-terahertz (sub-THz) band offers the potential to increase the capacity of communication systems due to its wide bandwidth and the ease of continuous wireless resource allocation. However, due to its strong linearity and significant signal attenuation, the sub-terahertz band has mainly been applied in restricted fields such as in-device communication, short-range P2P communication, and wireless backhaul. To harness the sub-terahertz band, characterized by ultra-small cell coverage and very weak wave scattering alongside its strong linearity, technologies such as large-scale antenna arrays for precise beamforming, distributed multi-point multi-antenna systems, and multi-radio multi-connectivity are required. The multi-radio multi-connectivity technology enables users to simultaneously connect to different bands, such as a frequency range 1 (FR1) band, frequency range 2 (FR2) band, and sub-terahertz band.

SUMMARY

Exemplary embodiments of the present disclosure are directed to providing a method and an apparatus for managing radio bearers in multi-radio multi-connectivity.

According to a first exemplary embodiment of the present disclosure, a method of a terminal may comprise: transmitting user plane (UP) data to at least one node among a master node (MN) or a second secondary node (SN) through a first data radio bearer (DRB); in response to identifying an uplink (UL) coverage loss in the second SN, determining switching from the first DRB to a second DRB based on a bearer switching rule; transmitting a request for bearer switching to the second DRB to the MN; receiving a response for bearer switching to the second DRB from the MN; identifying whether a bearer switching result included in the response of bearer switching indicates success or failure; in response to identifying that the bearer switching result indicates success, temporarily suspending the first DRB; and transmitting the UP data to at least one node among the MN or a first SN through the second DRB.

Each of the first DRB and the second DRB may be configured as one of a master cell group (MCG) bearer, a first secondary cell group (SCG) bearer, a second SCG bearer, or a split bearer; the MCG bearer, first SCG bearer, and second SCG bearer may be classified as non-split bearers; the MCG bearer may use radio resources of the MN, the first SCG bearer may use radio resources of the first SN, the second SCG bearer may use radio resources of the second SN, and the split bearer may use all of radio resources of the MN, radio resources of the first SN, and radio resources of the second SN; and the radio resources of the MN, radio resources of the first SN, and radio resources of the second SN may belong to different frequency bands.

The split bearer may include a bearer of the first SCG terminated at the MN, a bearer of the second SCG terminated at the MN, a bearer of the MCG terminated at the first SN, a bearer of the second SCG terminated at the first SN, a bearer of the MCG terminated at the second SN, or a bearer of the first SCG terminated at the second SN.

The bearer switching rule may be a switching rule for split bearers, and when the UL coverage loss is identified, the terminal may select a split bearer having a same terminating point as the first DRB among the split bearers, and may determine the selected split bearer as the second DRB to which the first DRB is to be switched.

The bearer switching rule may be a switching rule for split bearers, and when the UL coverage loss is identified, the terminal may select a split bearer having a different terminating point from the first DRB among the split bearers, and may determine the selected split bearer as the second DRB to which the first DRB is to be switched.

The bearer switching rule may be a switching rule for non-split bearers, and when the UL coverage loss is identified, the terminal may select one bearer that is different from the first DRB and is connected to uplink among the non-split bearers, and may determine the selected one bearer as the second DRB to which the first DRB is to be switched.

The request for bearer switching may include at least one of cause information, information on a DRB to be suspended, information on a DRB to be switched, or information on at least one QoS flow mapped to the DRB to be suspended, the cause information may indicate the UL coverage loss, the information on the DRB to be suspended may be information on the first DRB, the information on the DRB to be switched may be information on the second DRB, and the information on the at least one QoS flow may be information of at least one QoS flow mapped to the first DRB.

The temporarily suspending of the first DRB may further comprise: re-establishing at least one QoS mapped to the first DRB to the second DRB.

The method may further comprise: in response to identifying bearer switching from the first DRB to the second DRB for the UP packet, reconfiguring a power allocated to UL transmission of the second SN.

The method may further comprise: in response to satisfying a predefined bearer recovery condition for the first DRB, performing a bearer recovery procedure to recover the first DRB.

The method may further comprise: in response to the bearer switching result indicating failure, performing a predefined bearer switching failure procedure, and the predefined bearer switching failure procedure further includes a single connectivity establishment procedure.

According to a second exemplary embodiment of the present disclosure, a method of a first communication node may comprise: receiving user plane (UP) data from a terminal connected to the first communication node through a first data radio bearer (DRB); in response to identifying an uplink (UL) coverage loss for the terminal, determining switching from the first DRB to a second DRB for the UP data based on a bearer switching rule; transmitting a request message for bearer switching for the UP data from the first DRB to the second DRB to each of a second communication node and a third communication node; receiving a bearer switching request acknowledgement message from each of the second communication node and the third communication node; in response to identifying the bearer switching from the first DRB to the second DRB for the UP data, transmitting a radio resource control (RRC) reconfiguration message including a request for bearer switching to the terminal; receiving an RRC reconfiguration complete message from the terminal; and transmitting a bearer switching complete message to each of the second communication node and the third communication node.

Each of the first communication node, the second communication node, and the third communication node may be one of a master node (MN), a first secondary node (SN), and a second SN in multi-radio multi-connectivity (MR-MC), and the first communication node, the second communication node, and the third communication node may use different frequency bands, respectively.

Each of the first DRB and the second DRB may be configured as one of a master cell group (MCG) bearer, a first secondary cell group (SCG) bearer, a second SCG bearer, or a split bearer; and the MCG bearer, the first SCG bearer, and the second SCG bearer may be classified as non-split bearers.

The bearer switching rule may be a switching rule for split bearers, and when the UL coverage loss is identified, the terminal may select a split bearer having a same terminating point as the first DRB among the split bearers, and may determine the selected split bearer as the second DRB to which the first DRB is to be switched.

The bearer switching rule may be a switching rule for non-split bearers, and when the UL coverage loss is identified, the terminal may select one bearer that is different from the first DRB and is connected to uplink among the non-split bearers, and may determine the selected one bearer as the second DRB to which the first DRB is to be switched.

The request for bearer switching may include at least one of cause information, information on a DRB to be suspended, information on a DRB to be switched, or information on at least one QoS flow mapped to the DRB to be suspended, the cause information may indicate the UL coverage loss, the information on the DRB to be suspended may be information on the first DRB, the information on the DRB to be switched may be information on the second DRB, and the information on the at least one QoS flow may be information of at least one QoS flow mapped to the first DRB.

According to a third exemplary embodiment of the present disclosure, a terminal may comprise at least one processor, and the at least one processor may cause the terminal to perform: transmitting user plane (UP) data to at least one node among a master node (MN) or a second secondary node (SN) through a first data radio bearer (DRB); in response to identifying an uplink (UL) coverage loss in the second SN, determining switching from the first DRB to a second DRB based on a bearer switching rule; transmitting a request for bearer switching to the second DRB to the MN; receiving a response for bearer switching to the second DRB from the MN; identifying whether a bearer switching result included in the response of bearer switching indicates success or failure; in response to identifying that the bearer switching result indicates success, temporarily suspending the first DRB; and transmitting the UP data to at least one node among the MN or a first SN through the second DRB.

Each of the first DRB and the second DRB may be configured as one of a master cell group (MCG) bearer, a first secondary cell group (SCG) bearer, a second SCG bearer, or a split bearer; the MCG bearer, first SCG bearer, and second SCG bearer may be classified as non-split bearers; the MCG bearer may use radio resources of the MN, the first SCG bearer may use radio resources of the first SN, the second SCG bearer may use radio resources of the second SN, and the split bearer may use all of radio resources of the MN, radio resources of the first SN, and radio resources of the second SN; and the radio resources of the MN, radio resources of the first SN, and radio resources of the second SN may belong to different frequency bands.

The split bearer may include a bearer of the first SCG terminated at the MN, a bearer of the second SCG terminated at the MN, a bearer of the MCG terminated at the first SN, a bearer of the second SCG terminated at the first SN, a bearer of the MCG terminated at the second SN, or a bearer of the first SCG terminated at the second SN.

According to the present disclosure, a bearer structure and matching rules for QoS flows in a communication system are defined for multi-radio multi-connectivity (MR-MC). A bearer management method can efficiently handle frequent cell coverage losses in an edge section of a high-frequency band such as the sub-THz band by utilizing the defined bearer structure and QoS matching rules. Consequently, the performance of the communication system can be enhanced.

DETAILED DESCRIPTION

Figure 1:
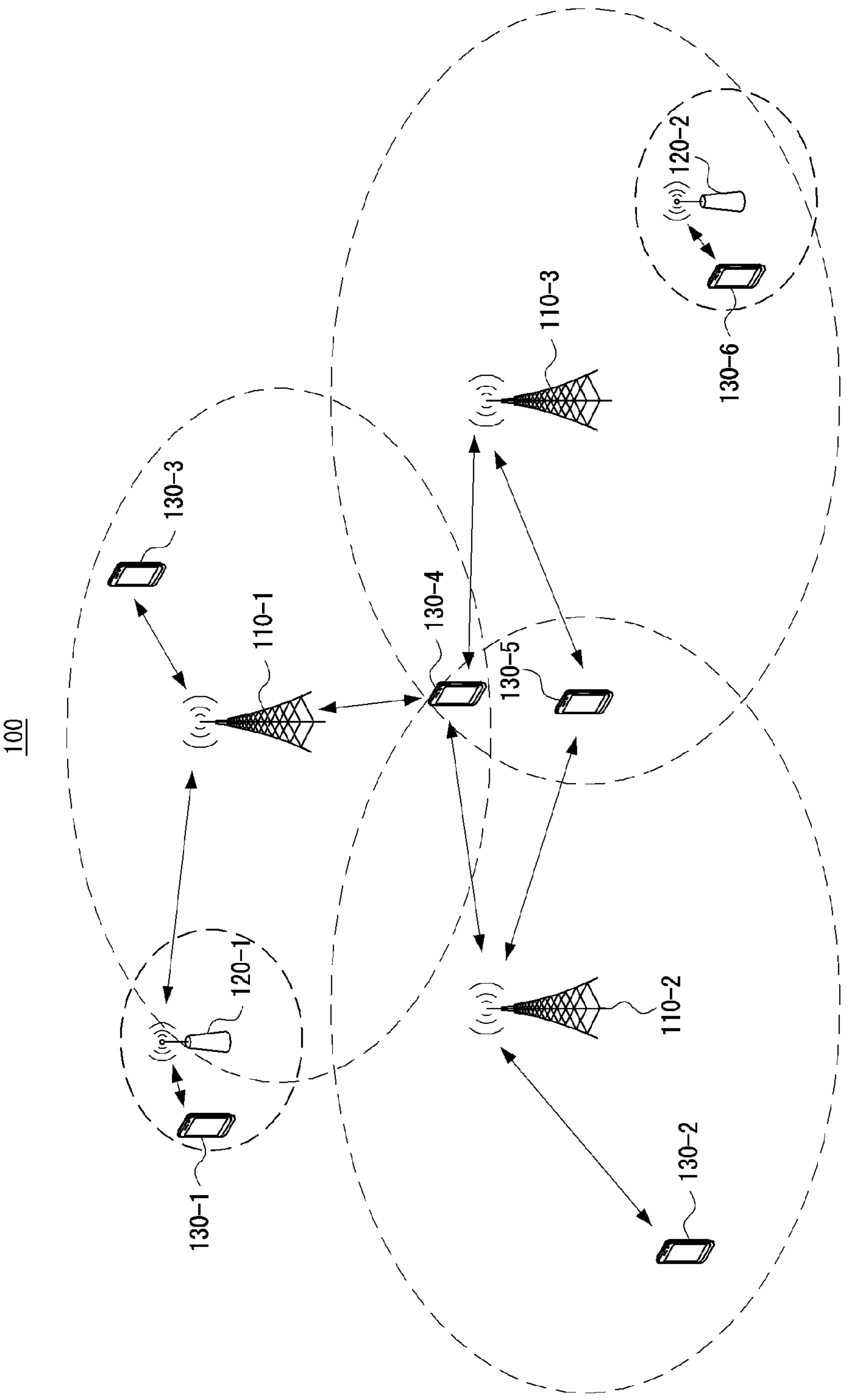
FIG. 1 is a conceptual diagram illustrating an exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and redundant descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g. long term evolution (LTE), LTE-advanced (LTE-A)), 5th generation (5G) communication (e.g. new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
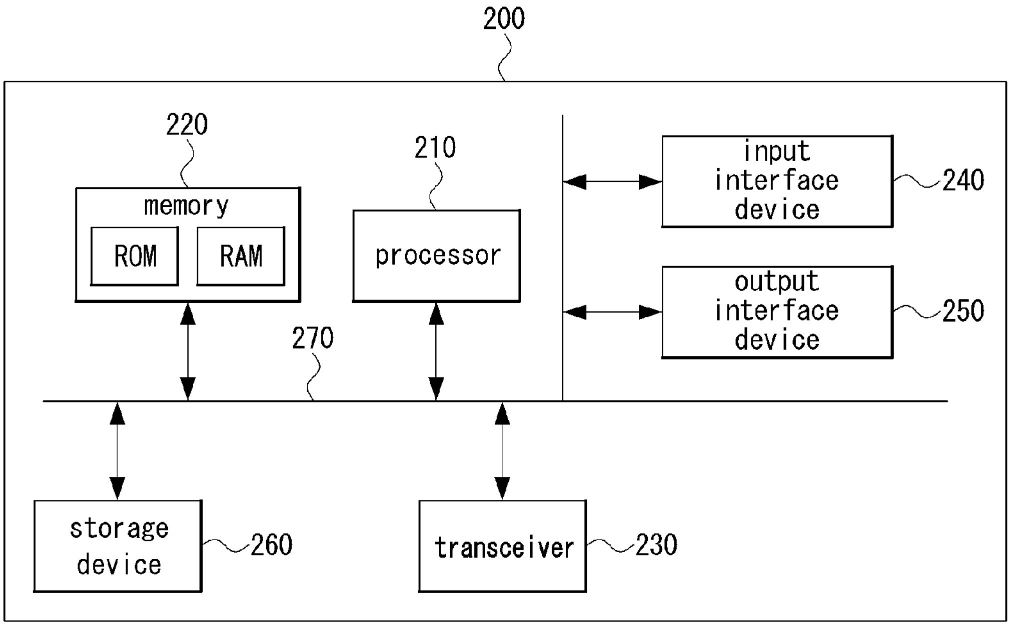
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g. a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g. a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station

110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g. transmission or reception of a signal) performed at a first communication node among communication nodes is described, the corresponding second communication node may perform a method (e.g. reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g. remote radio transmission/reception function, baseband processing function, and the like) of a communication protocol. Alternatively, the remote radio transmission/reception function among all the functions of the communication protocol may be performed by a transmission reception point (TRP) (e.g. flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Meanwhile, in 6G communication, connection to a sub-terahertz (sub-THz) band may be additionally provided in multi-radio dual connectivity (MR-DC). The existing DC may be expanded to provide connectivity to more than two bands, and multi-radio multi-connectivity (MR-MC), which allows users to simultaneously access two or more bands, may be supported.

[Uplink Coverage Loss in MR-MC]

Figure 3:
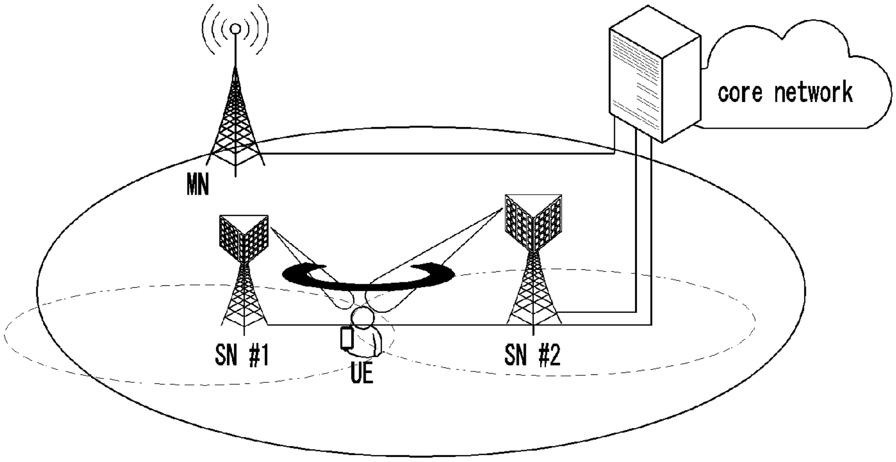
FIG. 3 is a conceptual diagram illustrating an exemplary embodiment of multi-radio multi-connectivity according to an exemplary embodiment of the present disclosure.

FIG. 3 is a conceptual diagram illustrating an exemplary embodiment of multi-radio multi-connectivity according to an exemplary embodiment of the present disclosure.

Referring to FIG. 3, a communication system may include a UE, a master node (MN), a plurality of secondary nodes (SNs) SN #1 and SN #2, and a core network (CN). The MN, SN #1, and SN #2 may be connected to the CN. A coverage of MN may include a coverage of SN #1 and a coverage of SN #2, and the coverages of SN #1 and SN #2 may partially overlap. The UE may be located in an area where the coverage of SN #1 and the coverage of SN #2 overlap and may be connected to SN #1 and SN #2. The UE may receive downlink (DL) transmissions from SN #1 and SN #2, respectively, and a sub-THz band (e.g. 0.1 to 0.3 THz band) in which the UE performs uplink (DL) transmission to each of SN #1 and SN #2 may provide a high data transmission rate. However, the sub-THz band may have a high data loss rate due to the sub-THz frequency characteristics (e.g. free-space attenuation, molecular absorption loss, non-line of sight (NLOS) path loss, etc.). In addition, the sub-THz band may have a smaller coverage compared to an F1 band (e.g. 3.4 to 3.6 GHz) and an F2 band (e.g. 24.45 to 27.5 GHz, 27.5 to 29.5 GHz).

In the sub-THz band, ultra small coverages may be supported. A UL coverage in the sub-THz band may be affected as follows.

Figure 4:
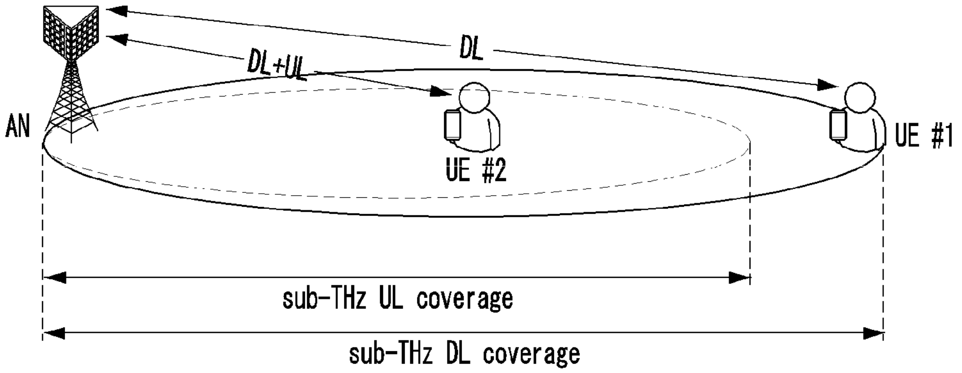
FIG. 4 is a conceptual diagram illustrating an exemplary embodiment for describing an uplink coverage in a sub-terahertz band according to an exemplary embodiment of the present disclosure.

FIG. 4 is a conceptual diagram illustrating an exemplary embodiment for describing an uplink coverage in a sub-terahertz band according to an exemplary embodiment of the present disclosure.

Referring to FIG. 4, a communication system may include an access node (AN), UE #1, and UE #2, and a sub-THz band may be used in DL transmission and UL transmission. The UE #1 may receive DL transmission from the AN. The UE #2 may receive the DL transmission from the AN and transmit UL transmission to the AN. The AN may receive the UL transmission from the UE #2. Based on the AN, a UL coverage of the UE #2 may be smaller than a DL coverage of the UE #1. The overall coverage of the UE #2 may be determined by the UL coverage thereof.

Meanwhile, when a UL coverage loss occurs, user plane (UP) data may be lost. The UE (e.g. UE #2 in FIG. 4) may select a connection in a band with excellent UL state to minimize UP data loss, and perform packet transmission routing. The UP data may refer to data (e.g. user data) of a user plane (UP). The UP data may be transmitted using radio protocol layers described below.

- Service data adaptation protocol (SDAP) layer
  - additional layer in 5G NR that can only be defined in the user plane
  - performs mapping between QoS flows and radio bearers and performs marking of QoS flow identifiers (IDs) to downlink and uplink packets
- Packet data convergence protocol (PDCP) layer
  - performs transmission of user data (UP data) and control data and routing of split bearers
- Radio link control (RLC) layer
  - provides a transparent mode (TM), un-acknowledged mode (UM), and acknowledged mode (AM) to satisfy various Quality of Service (QoS) required by radio bearers (RBs)
- Medium access control (MAC) layer maps multiple logical channels to multiple transport channels Physical (PHY) layer provides information transfer services using physical channels As described above, when a UL coverage loss occurs, the UP data may be lost. In the present disclosure, an SDAP entity may consider matching between QoS flows and data radio bearers (DRBs) for UL transmission. In other words, the SDAP entity may perform selection of existing DRB(s), modification on configuration of the existing DRB(s), and/or creation of new DRB(s). Depending on the operations of the SDAP entity, PDCP entity(ies) may subsequently be modified. In addition, the PDCP entity(s) may be suspended.

The above-described uplink coverage loss in MR-MC may be expanded to a downlink coverage loss in MR-MC.

[Bearer Structure for MR-MC]

Bearers for UP connection may be defined in connection with the CN as follows.

MN-terminated bearer: terminated at MN

SN-terminated bearer: terminated at SN

Meanwhile, UP data transmission may use MCG radio resources and/or SCG radio resources on a Uu interface (e.g. NR Uu). The following bearers may be defined for UP data transmission.

Master cell group (MCG) bearer: only MCG radio resources are involved.

Secondary cell group (SCG) bearer: only SCG radio resources are involved.

Split bearer: both MCG radio resources and SCG radio resources are involved.

For a split bearer, MN-terminated bearer, and SCG-bearer, PDCP data may be transmitted through an MN-SN UP interface between MN and SN.

[Radio Protocol Structure for MR-MC]

For MR-MC, a radio protocol structure may be presented as follows.

Figure 5:
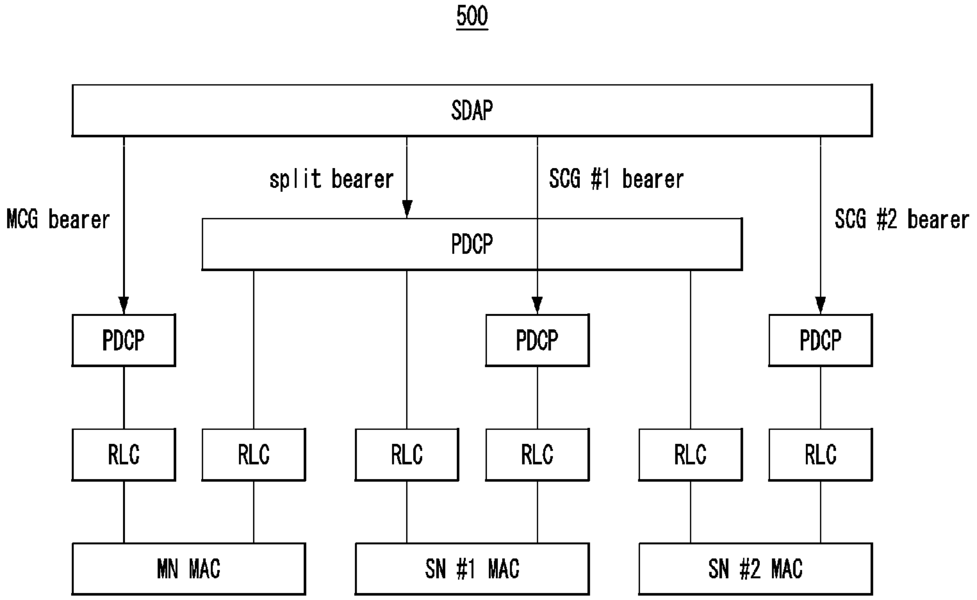
FIG. 5 is a conceptual diagram illustrating an exemplary embodiment of a radio protocol structure for MR-MC according to an exemplary embodiment of the present disclosure.

FIG. 5 is a conceptual diagram illustrating an exemplary embodiment of a radio protocol structure for MR-MC according to an exemplary embodiment of the present disclosure.

Referring to FIG. 5, an exemplary embodiment 500 of a radio protocol structure for MR-MC (hereinafter referred to as 'first radio protocol structure') may be a UP protocol structure from a UE perspective in MR-MC. Three frequency bands may be supported in MR-MC, and an AN may correspond to each frequency band. The first frequency band may be allocated to and used by MN. The second and third frequency bands may be allocated to and used by SNs (SN #1, SN #2), respectively.

Referring to FIG. 5, the first radio protocol structure 500 may include an SDAP entity and may include MAC entities (e.g. MN MAC, SN #1 MAC, SN #2 MAC) for the respective nodes. The SDAP entity may include data radio bearers (DRBs). The DRBs may be classified into bearers (e.g. MCG bearer, SCG #1 bearer, SCG #2 bearer) associated with the respective nodes and a split bearer, and each DRB may be associated with a PDCP entity. The PDCP entity associated with the split bearer may be associated with at least three RLC entities. One RLC entity may be associated with one PDCP entity. For each node, two RLC entities may be associated with one MAC entity. One RLC entity may be used for the bearer associated with each node, and another RLC entity may be used for the split bearer.

In the existing MR-DC, bearers for UP connection may be defined in connection with the CN as follows.

MN-terminated bearer: terminated at MN

SN-terminated bearer: terminated at SN

In addition, in the existing MR-DC, UP data transmission may use MCG radio resources and/or SCG radio resources on a Uu interface. The following bearers may be defined.

MCG bearer: only MCG radio resources are involved.

Secondary cell group (SCG) bearer: only SCG radio resources are involved.

Meanwhile, the first radio protocol structure 500 may support at least three frequency bands. The bearers and split bearers used for communication with ANs may require new bearers and split bearer other than the bearers and split bearer of the MR-DC described above. To support the MR-MC, new bearers and split bearer may be defined as shown in Table 1.

TABLE 1

| Bearer | Description |
|---|---|
| SCG #1 bearer | Only SCG #1 radio resources are involved |
| SCG #2 bearer | Only SCG #2 radio resources are involved |
| MN-terminated SCG #1 bearer | SCG #1 bearer terminated at MN |
| MN-terminated SCG #2 bearer | SCG #2 bearer terminated at MN |
| SN #1-terminated MCG bearer | Bearer terminated at SN #1 |
| SN #1-terminated SCG #2 bearer | SCG #2 bearer terminated at SN #1 |
| SN #2-terminated MCG bearer | Bearer terminated at SN #2 |
| SN #2-terminated SCG #1 bearer | SCG #1 bearer terminated at SN #2 |
| Split bearer with multi-RLC | The PDCP entity associated with the split bearer is associated with at least three RLC entities |

Table 1 is an example showing bearers newly defined in MR-MC.

In Table 1, the MCG bearer may only be associated with MCG radio resources. The SCG #1 bearer may only be associated with SCG #1 radio resources. The SCG #2 bearer may only be associated with SCG #2 radio resources. The MCG bearer may be terminated at SN #1 or SN #2. The SCG #1 bearer may be terminated at MN or SN #2, and the SCG #2 bearer may be terminated at MN or SN #1. In MR-MC, a split bearer may be a bearer with multiple RLCs (multi-RLC), and a PDCP entity associated with the split bearer may be associated with at least three RLC entities. Bearers with multi-RLC may include an MN-terminated split bearer, SN #1-terminated split bearer, and SN #2-terminated split bearer.

Figure 6:
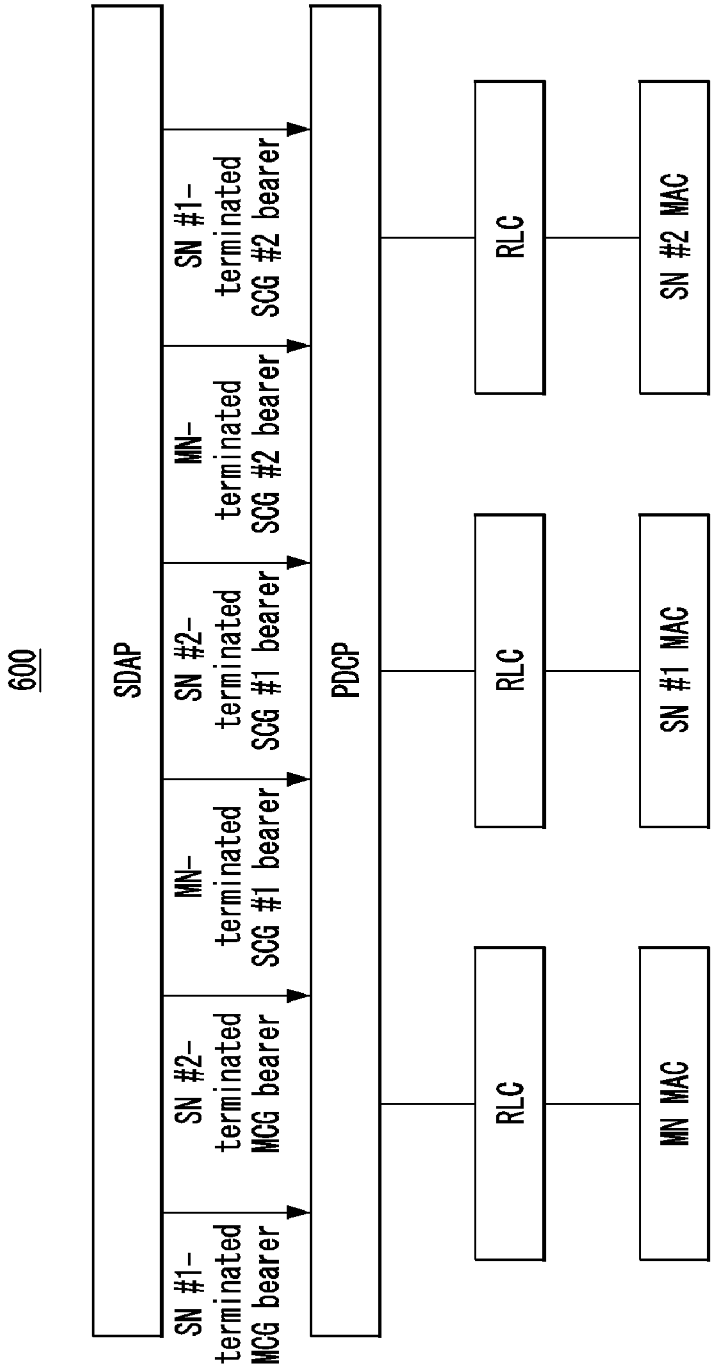
FIG. 6 is a conceptual diagram illustrating another exemplary embodiment of a radio protocol structure for MR-MC according to an exemplary embodiment of the present disclosure.

FIG. 6 is a conceptual diagram illustrating another exemplary embodiment of a radio protocol structure for MR-MC according to an exemplary embodiment of the present disclosure.

Referring to FIG. 6, another exemplary embodiment 600 of a radio protocol structure for MR-MC (hereinafter referred to as 'second radio protocol structure') may represent a radio protocol structure for a split bearer from a UE perspective. Only the split bearer, and its SDAP entity, PDCP entity, RLC entity, and MAC entity from the first radio protocol structure 500 shown in FIG. 5 may be shown.

In the second radio protocol structure 600, the PDCP entity may be associated with the split bearer. The PDCP entity may be associated with one primary RLC entity and at least two secondary RLC entities.

When the SDAP entity transmits bearer(s) other than a split type bearer, the SDAP entity may consider a connection state for each band. The SDAP entity may perform routing to PDCP entities. When the PDCP entity transmits a split bearer, the PDCP entity may consider a connection state for each band. The PDCP entity may perform routing to RLC entities.

Meanwhile, a radio protocol structure of each AN (i.e. MN, SN #1, or SN #2) for MR-MC may be similar to the first radio protocol structure 500. Each bearer (e.g. MCG bearer, SCG #1 bearer, or SCG #2 bearer) may be terminated at MN, SN #1, or SN #2.

In an exemplary embodiment, bearers may be associated with the MN's PDCP entities (i.e. MN PDCP #1 to MN PDCP #4) in the order of the MCG bearer, SCG #1 bearer, SCG #2 bearer, and split bearer. The MN may include six RLC entities (i.e. MN RLC #1 to MN RLC #6). Three RLC entities (i.e. MN RLC #1 to MN RLC #3) may be associated with non-split bearers (i.e. MCG bearer of MN, MCG bearer of SN #1 and MCG bearer of SN #2). The non-split bearers may be associated with three RLC entities (i.e. MN RLC #1 to MN RLC #3) in the order of the MCG bearer of MN, MCG bearer of SN #1, and MCG bearer of SN #2. The split bearer may be associated with three RLC entities (i.e. MN RLC #4 to MN RLC #6) in the order of the split bearer for MN, split bearer for SN #1, and split bearer for SN #2.

In an exemplary embodiment, an exemplary embodiment of the MN's radio protocol structure for MR-MC (hereinafter referred to as 'third radio protocol structure') may be configured as follows.

1) SDAP Entity
  - The MCG bearer of MN may be associated with the PDCP #1 entity of MN.
  - The SCG #1 bearer of MN may be associated with the PDCP #2 entity of MN.
  - The SCG #2 bearer of MN may be associated with the PDCP #3 entity of MN.
  - The split bearer may be associated with the PDCP #4 entity of MN.

2) PDCP Entities
  - The PDCP #1 entity of MN may be associated with the RLC #1 of MN.
  - The PDCP #2 entity of MN may be associated with the RLC #2 of SN #1 via an Xn interface.
  - The PDCP #3 entity of MN may be associated with the RLC #2 of SN #2 via an Xn interface.
  - The PDCP #4 entity of MN may be associated with the RLC #4 of MN.

3) RLC Entities
  - The PDCP #1 entity of MN may be associated with the RLC #1 entity of MN.
  - The PDCP #1 entity of SN #1 may be associated with the RLC #2 entity of MN via an Xn interface.
  - The PDCP #1 entity of SN #2 may be associated with the RLC #3 entity of MN via an Xn interface.
  - The PDCP #4 entity of MN may be associated with the RLC #4 entity of MN.
  - The PDCP #4 entity of SN #1 may be associated with the RLC #5 entity of MN via an Xn interface.
  - The PDCP #4 entity of SN #2 may be associated with the RLC #6 entity of MN via an Xn interface.

4) MAC entity
  - The RLC #1 entity to RLC #6 entity of MN may be associated with the MAC entity.

The third radio protocol structure may be applied equally to SN #1 and SN #2.

The first radio protocol structure 500 may be used at the UE for DL reception and UL transmission, respectively, and the third radio protocol structure may be used at the AN (e.g. MN, SN #1, or SN #2) for DL transmission and UL transmission, respectively.

[Bearer Switching Rules]

When a high frequency band such as a sub-THz band is used, a UL coverage loss may frequently occur in an edge section of the high frequency band. In MR-MC, a bearer switching method may be used to solve UL coverage loss or DL coverage loss problems. Regarding the bearer switching method, bearer switching rules may be considered. First, a split bearer switching rule will be described.

Bearer Switching Rule: In Case of Switching a Split Bearer

As shown in FIG. 6, a split bearer may be one of an MN-terminated SCG #1 bearer, MN-terminated SCG #2 bearer, SN #1-terminated MCG bearer, SN #1-terminated SCG #2 bearer, SN #2-terminated MCG bearer, and SN #2-terminated SCG #1 bearer. Anode at which the split bearer is terminated may be referred to as a terminating point. Here, the node may be one of MN, SN #1, and SN #2.

<Bearer Switching Rule: The Same Terminating Point for a Source Bearer and a Target Bearer>

A source bearer may be switched to a target bearer with the same terminating point based on a bearer switching rule. Here, the source bearer and target bearer may each be a split bearer.

In an exemplary embodiment, it may be assumed that the UE is connected to the MN, SN #1 and SN #2, and UP data is transmitted and received through the SN #1-terminated MCG bearer.

In an exemplary embodiment, when a UL coverage loss occurs on an MCG's Uu interface, the bearer switching rule may select the SN #1-terminated SCG #2 bearer as the target bearer for the SN #1-terminated MCG bearer. If the SN #1-terminated MCG bearer is the source bearer, the target bearer may be selected as the SN #1-terminated SCG #2 bearer with the same terminating point as shown in Table 2 according to the bearer switching rule.

TABLE 2

| Bearer switching rule: the source bearer and the target bearer have the same terminating point Source bearer: SN #1-terminated MCG bearer, UL coverage loss: MCG Uu interface | | |
|---|---|---|
| MN-terminated SCG #1 bearer | X | different terminating point |
| MN-terminated SCG #2 bearer | X | different terminating point |
| SN #1-terminated MCG bearer | — | source bearer |
| SN #1-terminated SCG #2 bearer | ○ | the same terminating point |
| SN #2-terminated MCG bearer | X | different terminating point |
| SN #2-terminated SCG #1 bearer | X | different terminating point |

Table 2 is an example to describe the bearer switching rule where the terminating points of the source bearer and target bearer are the same, and may show an example of selecting a split bearer with the same terminating point for the SN #1-terminated MCG bearer.

In Table 2, the bearer switching rule may be to switch the source bearer for the split bearer to a split bearer with the same terminating point, and the source bearer may be the SN #1-terminated MCG bearer. In addition, a UL coverage may be lost on the MCG's Uu interface. The SN #1-terminated MCG bearer may be a destination of QoS flow(s) to which the SN #1 corresponds, and the SN #1-terminated SCG #2 bearer may be selected as the target bearer.

In an exemplary embodiment, when a UL coverage is lost on the MCG's Uu interface, an SN #1-terminated MCG bearer may be switched to an SN #1-terminated SCG #2 bearer based on the bearer switching rule. When the SN #1-terminated MCG bearer is switched to the SN #1-terminated SCG #2 bearer, a Uu interface used for transmission and reception of UP data may be changed. In other words, the frequency band used (e.g. sub-6 GHz band) may be changed to another frequency band (e.g. sub-THz band).

When a UL coverage is lost on an interface of SCG #1 or an interface of SCG #2, the bearer switching rule described above may be applied in an exemplary embodiment.

In another exemplary embodiment, it may be assumed that the UE is connected to the MN, SN #1 and SN #2, and UP data is transmitted and received through the SN #2-terminated MCG bearer.

In another exemplary embodiment, when a UL coverage loss occurs on the MCG's Uu interface, the bearer switching rule may select the SN #2-terminated SCG #1 bearer as a target bearer for the SN #2-terminated MCG bearer. When the SN #2-terminated MCG bearer is the source bearer, the target bearer may be selected as the SN #2-terminated SCG #1 bearer with the same terminating point as shown in Table 3 according to the bearer switching rule.

The exemplary embodiment in Table 2 describes the case where a UL coverage loss occurs, but exemplary embodiments are not limited thereto. The above-described method may be applied even when a DL coverage loss occurs in the Uu interface of MCG, SCG #1, or SCG #2.

TABLE 3

Bearer switching rule: the source bearer and the target bearer have the same terminating point
Source bearer: SN #2-terminated MCG bearer,
UL coverage loss: MCG Uu interface

| | | |
|---|---|---|
| MN-terminated SCG #1 bearer | X | different terminating point |
| MN-terminated SCG #2 bearer | X | different terminating point |
| SN #1-terminated MCG bearer | X | different terminating point |
| SN #1-terminated SCG #2 bearer | X | different terminating point |
| SN #2-terminated MCG bearer | — | source bearer |
| SN #2-terminated SCG #1 bearer | X | the same terminating point |

Table 3 is an example to describe the bearer switching rule where the terminating points of the source bearer and target bearer are the same, and may show an example of selecting a split bearer with the same terminating point for the SN #2-terminated MCG bearer.

In Table 3, the bearer switching rule may be to switch a source bearer for a split bearer to a split bearer with the same terminating point, and the source bearer may be the SN #2-terminated MCG bearer. In addition, a UL coverage may be lost on the MCG's Uu interface. The SN #2-terminated MCG bearer may be a destination of QoS flow(s) to which the SN #2 corresponds, and the SN #2-terminated SCG #1 bearer may be selected as the target bearer.

In another exemplary embodiment, when a UL coverage is lost on the MCG's Uu interface, the SN #2-terminated MCG bearer may be switched to the SN #2-terminated SCG #1 bearer based on the bearer switching rule. When the SN #2-terminated MCG bearer is switched to the SN #2-terminated SCG #1 bearer, a Uu interface used for transmission and reception of UP data may be changed. In other words, the frequency band used (e.g. sub-6 GHz band) may be changed to another frequency band (e.g. millimeter wave band).

When a UL coverage is lost on an interface of SCG #1 or an interface of SCG #2, the bearer switching rule described above may be applied to another exemplary embodiment.

<Bearer Switching Rule: Different Terminating Points for a Source Bearer and a Target Bearer>

On the other hand, a source bearer may be switched to a bearer with a different terminating point based on a bearer switching rule. The bearer to which the source bearer is to be switched according to the bearer switching rule may be referred to as a target bearer. Here, the source bearer and target bearer may each be a split bearer.

In an exemplary embodiment, it may be assumed that the UE is connected to the MN, SN #1 and SN #2, and UP data is transmitted and received through the MN-terminated SCG #1 bearer.

In an exemplary embodiment, when a UL coverage loss occurs on the SCG #1's Uu interface, the MN-terminated SCG #1 bearer may select a bearer with a different terminating point based on the bearer switching rule. In case of the MN-terminated SCG #1 bearer, a bearer with a different terminating point may be selected as shown in Table 4.

The exemplary embodiment in Table 3 describes a case where a UL coverage loss occurs, but is not limited thereto. The above-described method may be applied even when a DL coverage loss occurs in a Uu interface of the MCG, SCG #1, or SCG #2.

TABLE 4

Bearer switching rule: the source bearer and the target bearer have different terminating points
Source bearer: MN-terminated SCG #1 bearer,
UL coverage loss: SCG #1 Uu interface

| | | |
|---|---|---|
| MN-terminated SCG #1 bearer | — | source bearer |
| MN-terminated SCG #2 bearer | X | the sane terminating point |
| SN #1-terminated MCG bearer | ○ | different terminating point |
| SN #1-terminated SCG #2 bearer | X | Lack of relevance with source bearer |
| SN #2-terminated MCG bearer | ○ | different terminating point |
| SN #2-terminated SCG #1 bearer | X | UL coverage is lost |

Table 4 is an example to describe the bearer switching rule where the terminating points of the source bearer and target bearer are different, and may show an example of selecting a bearer with a different terminating point for the MN-terminated SCG #1 bearer.

In Table 4, the bearer switching rule may be to switch a source bearer to a bearer with a different terminating point with respect to a split bearer, and the source bearer may be the MN-terminated SCG #1 bearer. In addition, a UL coverage may be lost on an interface of SCG #1. The MN-terminated SCG #1 bearer may be a destination of QoS flow(s) to which the MN corresponds, and the SN #1-terminated MCG bearer or SN #2-terminated MCG bearer may be selected as the target bearer. On the other hand, the SN #1-terminated SCG #2 bearer has a different terminating point from the MN-terminated SCG #1 bearer, but may not be selected as the target bearer considering its relevance with the MN-terminated SCG #1 bearer.

In an exemplary embodiment, when a UL coverage is lost on the interface of SCG #1, the MN-terminated SCG #1 bearer may be switched to the SN #1-terminated MCG bearer or SN #2-terminated MCG bearer based on the bearer switching rule. When the MN-terminated SCG #1 bearer is switched to the SN #1-terminated MCG bearer or SN #2-terminated MCG bearer, a Uu interface used for transmission and reception of UP data may be changed. In other words, the frequency band used (e.g. sub-6 GHz band) may be changed to another frequency band (e.g. millimeter wave band or sub-THz band).

In an exemplary embodiment, the MN may receive QoS flow(s) associated with the MN-terminated SCG #1 bearer. The MN may filter the received QoS flow(s) without moving them to the terminating point (i.e. SN #1 or SN #2), and process them in the MN's corresponding PDCP entity.

In an exemplary embodiment, the MN-terminated SCG #1 bearer may be switched to one of the SN #1-terminated MCG bearer and the SN #2-terminated MCG bearer based on preconfigured bearer switching configuration information. For example, the bearer switching configuration information may include priorities for split bearers. If the SN #1-terminated MCG bearer has a higher priority than the SN #2-terminated MCG bearer, the SN #1-terminated MCG bearer may be selected.

When a UL coverage is lost on an interface of MCG or interface of SCG #1, the bearer switching rule described above may be applied in an exemplary embodiment.

The exemplary embodiment in Table 4 describes the case where a UL coverage loss occurs, but exemplary embodiments are not limited thereto. The above-described method may be applied even when a DL coverage loss occurs on a Uu interface of the MCG, SCG #1, or SCG #2.

Regarding the bearer switching rule, switching of non-split bearers will be described.

Bearer Switching Rule: In Case of Switching a Non-Split Bearer

When a UL coverage is lost in one cell group, a corresponding DRB may be a bearer (i.e. non-split bearer) that is not a split bearer. A bearer switching rule may be applied to the non-split bearer. According to the bearer switching rule, the non-split bearer may be switched as follows. Here, the non-split bearer may include the MCG bearer, SCG #1 bearer, and SCG #2 bearer shown in FIG. 5.

<Bearer Switching Rule: Switching to a Non-Split Bearer>

A UL coverage may be lost on a non-split bearer. The bearer on which a UL coverage is lost may be switched to a non-split bearer based on a bearer switching rule.

In an exemplary embodiment, it may be assumed that the UE is connected to the MN, SN #1, and SN #2, and UP data is transmitted through an MCG bearer.

In an exemplary embodiment, when a UL coverage loss occurs on the MCG's Uu interface, an SCG #1 bearer or SCG #2 bearer may be selected as a bearer to which the source bearer is to be switched according to the bearer switching rule. The MCG bearer may be switched to either the SCG #1 bearer or SCG #2 bearer based on bearer switching configuration information. For example, the bearer switching configuration information may include priorities for non-split bearers. A priority of the SCG #2 bearer may be higher than a priority of the SCG #1 bearer, and the SCG #2 bearer may be selected as the target bearer.

<Bearer Switching Rule: Switching to a Split Bearer>

In an exemplary embodiment, it may be assumed that the UE is connected to the MN, SN #1, and SN #2, and UP data is transmitted through an MCG bearer.

In an exemplary embodiment, when a UL coverage loss occurs on the MCG's Uu interface, the bearer switching rule may select the MN-terminated SCG #1 bearer or MN-terminated SCG #2 bearer as a target bearer with respect to the MCG bearer. The bearer switching rule may switch the MCG bearer to one of the MN-terminated SCG #1 bearer and the MN-terminated SCG #2 bearer based on the bearer switching configuration information. For example, the bearer switching configuration information may include priorities for split bearers, as previously described. The MN-terminated SCG #2 bearer may have a higher priority than the MN-terminated SCG #1 bearer, and thus the MN-terminated SCG #2 bearer may be selected.

In MR-MC, when a UL coverage loss occurs, a DRB related to the UL coverage loss may be switched to another DRB based on the bearer switching rule as described above. UP data may be transmitted and received through the switched bearer. The bearer switching rule may be applied to the MN, SN #1, SN #2, and UE.

The exemplary embodiment has been described for the case where a UL coverage loss occurs, but exemplary embodiments are not limited thereto. The above-described method may be applied even when a DL coverage loss occurs in a Uu interface of the MCG, SCG #1, or SCG #2.

[Bearer Switching Method and Procedure]

In MR-MC, the UE may be connected to the MN, SN #1, and SN #2, and the UE may transmit and receive UP data with at least one AN from among the connected MN, SN #1, and SN #2. The MN, SN #1, and SN #2 may each use different frequency bands. For example, a sub-6 GHz band may be allocated to and used by MN, and a millimeter wave band may be allocated to and used by SN #1. In addition, a sub-THz band may be allocated to and used by SN #2.

To support MR-MC, the UE may include the SDAP entity, multiple PDCP entities, multiple RLC entities, and multiple MAC entities as shown in FIG. 5. The DRBs may be classified into the MCG bearer, SCG #1 bearer, SCG #2 bearer, and split bearer. The MCG bearer may be a bearer that uses only MCG resources, the SCG #1 bearer may be a bearer that uses only SCG #1 resources, and the SCG #2 bearer may be a bearer that uses only SCG #2 resources. On the other hand, the split bearer may be a bearer that uses a combination of MCG resources, SCG #1 resources, and SCG #2 resources.

The SDAP entity may establish a mapping relationship with DRB(s) within the AN(s) based on IP-based QoS information and manage the DRB(s). In other words, the SDAP entity may deliver UP data to the connected AN(s) and perform mapping between QoS flow(s) and DRB(s) for DL and UL. Here, the AN(s) may mean at least one AN among the MN, SN #1, and SN #2 connected in MR-MC, as described above.

Meanwhile, when the SDAP entity manages states of DRBs for each AN, the states of DBRs may be defined as follows. Here, the AN may be one of the MN, SN #1, and SN #2.

- A DRB between the AN and UE is in a connected state (i.e. DRB connected state (RB_connected)).
- A DRB between the AN and UE is in a suspended state due to a temporary loss of connection (i.e. DRB suspended state (RB_suspended)).
- A DRB between the AN and UE is in a disconnected state (i.e. DRB disconnected state (RB_disconnected)).

In MR-MC, a DRB connection between the AN and UE may experience a loss only in UL in the RB_connected state. When a loss occurs only in UL, the UL coverage loss may be determined as a temporary loss, and the DRB connection state between the AN and UE may transition from the RB_connected state to the RB_suspended state. Thereafter, when the UL coverage loss is recovered, the temporarily suspended DRB between the AN and UE may be resumed and connected. For example, a moving obstacle may be located between the AN and UE, and the UL coverage loss may occur between the AN and UE. If the moving obstacle deviates from a UL transmission path between the AN and UE after a certain period of time, the UL coverage loss between the AN and UE may not occur. The temporarily suspended DRB between the AN and UE may be resumed and connected. In other words, when the UL coverage loss is recovered, the DRB connection state between the AN and UE may transition from the RB_suspended state to the RB_connected state.

Meanwhile, in MR-MC, if a DRB connection between the AN and UE is lost only in UL, the SDAP entity may perform a bearer switching procedure as follows.

Bearer Switching Procedure

Figure 7:
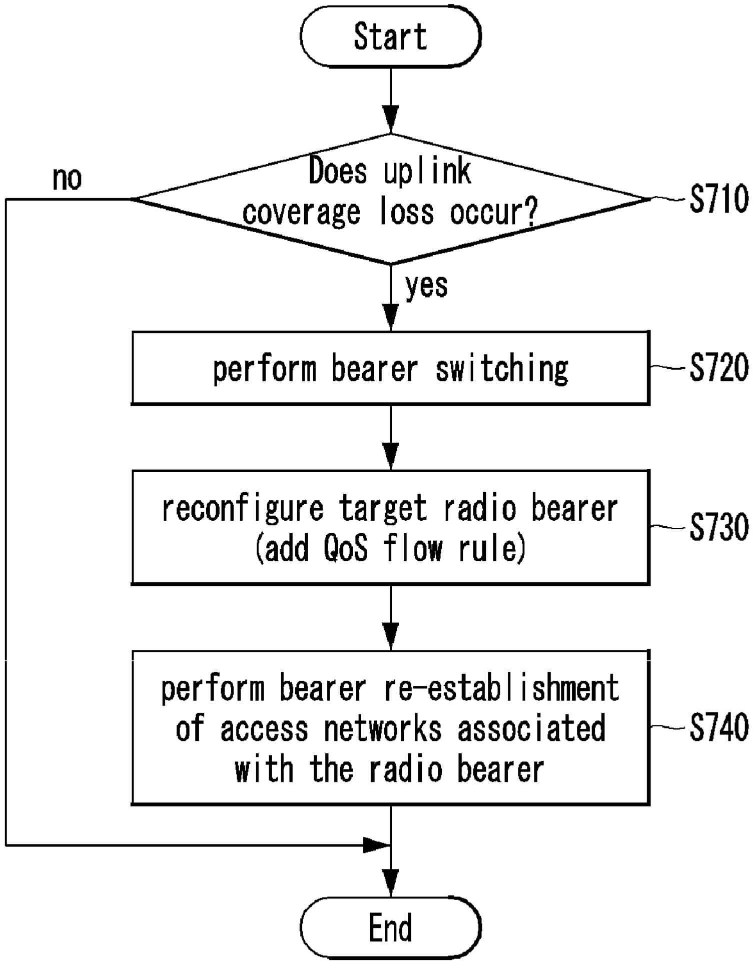
FIG. 7 is a flow chart illustrating an exemplary embodiment of a DRB switching procedure due to a UL coverage loss according to an exemplary embodiment of the present disclosure.

FIG. 7 is a flow chart illustrating an exemplary embodiment of a DRB switching procedure due to a UL coverage loss according to an exemplary embodiment of the present disclosure.

Referring to FIG. 7, when a UL coverage loss is identified, the SDAP entity may perform a DRB switching procedure. In the DRB switching procedure, the SDAP entity may switch a source bearer to a target bearer based on a bearer switching rule. For the target bearer, the SDAP entity may apply a QoS rule mapped to the source bearer. In addition, the SDAP entity may re-establish bearer(s) of AN(s) associated with the target bearer. It may be assumed that the AN and UE are transmitting and receiving UP data using one DRB. In FIG. 7, for convenience of description, the bearer switching procedure is described for one AN and one DRB, but as shown in FIGS. 5 and 6, there may be multiple ANs and multiple DRBs in MR-MC. Here, the source bearer may refer to the DRB used for transmission and reception of UP data in the AN where the UL coverage loss occurs. The AN may be expressed as an access network. The bearer may mean a radio bearer (RB).

In step S710, the SDAP entity may identify whether a UL coverage is lost on the source bearer. If a UL coverage loss is identified, the SDAP entity may perform steps S710 to S740. The UL coverage loss may be indicated from a lower layer entity (e.g. MAC entity, RRC entity) to the SDAP entity. Here, the lower layer may include the PCDP layer, RLC layer, and MAC layer, as shown in FIG. 6. In addition, the PHY layer may be included in the lower layer.

The lower layer entity may detect the UL coverage loss based on a UL coverage loss condition. The lower layer entity may transmit an indication indicating the detected UL coverage loss to the SDAP entity. The SDAP entity may identify whether an indication indicating the UL coverage loss has been delivered from the lower layer entity in step S710. If it is identified that the indication indicating the UL coverage loss has been delivered from the lower layer entity, the SDAP entity may determine that a UL coverage has been lost. Here, the indication indicating the detected UL coverage loss may be expressed as UL_loss_indication.

In an exemplary embodiment, the UL coverage loss condition may be a condition for comparing a measurement value of a DL reception beam for a predetermined time and a measurement threshold. For a UL transmission beam, beam correspondence may be applied. In other words, the UL transmission beam may correspond to the DL reception beam. Here, the predetermined time may mean a UL coverage loss evaluation time.

In an exemplary embodiment, if the measurement value of the DL reception beam for the predetermined time is less than the threshold, it may be determined that the UL coverage loss condition is satisfied. If the measurement value of the DL reception beam for the predetermined time is not less than the threshold, it may be determined that the UL coverage loss condition is not satisfied. If it is determined that the UL coverage loss condition is satisfied, the MAC entity may deliver UL_loss_indication to the SDAP entity. The measurement value and threshold for the DL reception beam may be Received Signal Strength Indicator (RSSI), Received Signal Code Power (RSCP), Received Signal Code Power (RSRP), RSRQ Reference Signal Received Quality (RSRQ), and/or the like.

In another exemplary embodiment, the UL coverage loss condition may be a condition in which the number of consecutive data decoding failures for data received through the DL reception beam is compared with a data decoding failure threshold. As previously described, for the UL transmission beam, beam correspondence may be applied.

In another exemplary embodiment, if the number of consecutive failures in decoding data received through the DL reception beam exceeds the data decoding failure threshold, the UL coverage loss condition may be determined to be satisfied. If it is determined that the UL coverage loss condition is satisfied, the MAC entity may deliver UL_loss_indication to the SDAP entity.

In step S720, if it is identified that the UL coverage is lost in the source bearer in step S710, the SDAP entity may perform bearer switching for the source bearer, and the source bearer may be switched to the target bearer. As described above, the source bearer may refer to the DRB used for transmission (or reception) of UP data between the AN and UE.

In step S730, the SDAP entity may perform a process of reconfiguring the bearer to be used for transmission (or reception) of UP data between the AN and UE to the target bearer switched in the step S720. During the reconfiguration process of the target bearer, a QoS flow rule mapped to the UP data may be added.

In step S740, bearer re-establishment may be performed for ANs associated with the target bearer. If the bearer switching rule is a rule for switching a non-split bearer to a non-split bearer, the target bearer may be associated with one access network.

When the UL coverage loss is identified, transmission and reception of UP data may be temporarily suspended. A connection state of the DRB may transition to the RB_suspended state. When the above-described bearer switching procedure is performed, the AN and UE may reconfigure a rule of matching between QoS flows and bearers. The SDAP entity may transition the DRB connection state from the RB_suspended state to the RB_connected state. The UP data may be transmitted and received using the switched bearer. Here, the AN may be an AN corresponding to the switched bearer, and may not be the AN corresponding to the bearer in which the UL coverage loss occurs.

Meanwhile, the detailed operation of the above-described bearer switching procedure may differ depending on the type of source bearer, type of target bearer, and terminating point of bearer.

First Exemplary Embodiment of Bearer Switching Procedure

It may be assumed that the UE is connected to the MN, SN #1 and SN #2, and UP data is transmitted and received using the SN #1-terminated MCG bearer. In addition, it may be assumed that a bearer switching rule is a rule that switches a split bearer to a split bearer with the same terminating point.

A UL coverage loss on the MCG's Uu interface may be identified in step S710, and the SDAP entity may perform step S720. In step S720, the SDAP entity may switch the SN #1-terminated MCG bearer to the SN #1-terminated SCG #2 bearer according to the bearer switching rule as shown in Table 2.

In step S720, the SDAP entity may re-establish flow(s) mapped to the SN #1-terminated MCG bearer to the SN #1-terminated SCG #2 bearer.

Meanwhile, since the terminating points of the SN #1-terminated MCG bearer and the SN #1-terminated SCG #2 bearer are the same, the SDAP entity may not perform step S740.

In the first exemplary embodiment, the case where a UL coverage loss occurs on the MCG's Uu interface has been described, but exemplary embodiments are not limited thereto. Even when a UL coverage loss occurs on the Uu interface of SCG #1 or SCG #2, the method described above in the first exemplary embodiment may be applied.

Second Exemplary Embodiment of Bearer Switching Procedure

In a second exemplary embodiment, it may be assumed that the UE is connected to the MN, SN #1, and SN #2, and UP data is transmitted and received using the MN-terminated SCG #1 bearer. In addition, it may be assumed that a bearer switching rule is a rule that switches a split bearer to a split bearer with a different terminating point.

AUL coverage loss on the Uu interface of SCG #1 may be identified in step S710, and the SDAP entity may perform step S720. In step S720, the MN-terminated SCG #1 bearer may be switched to the SN #1-terminated MCG bearer or SN #2-terminated MCG bearer according to the bearer switching rule as shown in Table 4. The SDAP entity may select the SN #1-terminated MCG bearer as a switched bearer based on bearer switching configuration information, and the MN-terminated SCG #1 bearer may be switched to the SN #1-terminated MCG bearer.

In step S730, the SDAP entity may re-establish QoS flow(s) mapped to the MN-terminated SCG #1 bearer to the SN #1-terminated MCG bearer. In step S740, the SDAP entity may re-establish the bearers of the SN #1 and MN associated with the SN #1-terminated MCG bearer.

In step S730, when flow(s) mapped to the MN-terminated SCG #1 bearer are re-established to the SN #1-terminated MCG bearer, the Uu interface may be moved from the SCG #1 to the MCG. In other words, the frequency band used may change. For example, the SCG #1 may use a millimeter wave band, and the MCG may use a sub-6 GHz band. The frequency band used may be changed from the millimeter wave band to the sub-6 GHz band. Meanwhile, the MN may receive QoS flow(s) mapped to the SN #1-terminated MCG bearer and may not move the terminating point to the SN #1. The MN may filter the received QoS flow(s) and process them in the PDCP entity.

In the second exemplary embodiment, the case where a UL coverage loss occurs on the Uu interface of SCG #1 has been described, but the exemplary embodiments are not limited thereto. Even when a UL coverage loss occurs on the Uu interface of the MCG or SCG #2, the method described above in the second exemplary embodiment may be applied.

Third Exemplary Embodiment of Bearer Switching Procedure

In a third exemplary embodiment, it may be assumed that the UE is connected to the MN, SN #1, and SN #2, and UP data is transmitted and received using an MCG bearer. In addition, it may be assumed that a bearer switching rule is a rule that switches a non-split bearer to a non-split bearer.

A UL coverage loss on the MCG's Uu interface may be identified in step S710, and the SDAP entity may perform step S720. In step S720, the SDAP entity may switch the MCG bearer to the SCG #2 bearer as described above based on the bearer switching rule and bearer switching configuration information. In other words, the SCG #1 bearer or SCG #2 bearer may be selected as a bearer to which the MCG bearer is to be switched according to the bearer switching rule. The bearer switching configuration information may include priorities of bearers to be switched, and the SCG #2 bearer with the highest priority may be selected among the SCG #1 bearer and SCG #2 bearer. The MCG bearer may be switched to the SCG #2 bearer.

In step S730, the SDAP entity may re-establish QoS flow(s) mapped to the MCG bearer to the SCG #2 bearer. Then, in step S740, the SDAP entity may re-establish bearers of the SN #2 associated with the SCG #2 bearer.

The UE may transmit QoS flow(s) to the SN #2 using the SCG #2 bearer. The SN #2 may receive the QoS flow(s) from the UE using the SCG #2 bearer. The SN #2 may forward QoS flow(s) to the MN through an Xn interface. In addition, depending on the bearer switching configuration information, the SN #2 may directly transmit the QoS flow(s) to the CN without forwarding them to the MN.

In the third exemplary embodiment, the case where a UL coverage loss occurs on the MCG's Uu interface has been described, but exemplary embodiments are not limited thereto. Even when a UL coverage loss occurs on the Uu interface of the SCG #1 or SCG #2, the method described above in the third exemplary embodiment may be applied.

Fourth Exemplary Embodiment of Bearer Switching Procedure

In a fourth exemplary embodiment, it may be assumed that the UE is connected to the MN, SN #1, and SN #2, and UP data is transmitted and received using the MCG bearer. In addition, it may be assumed that a bearer switching rule is a rule the switches a non-split bearer to a split bearer.

A UL coverage loss on the MCG's Uu interface may be identified in step S710, and the SDAP entity may perform step S720. In step S720, the SDAP entity may switch the MCG bearer to the MN-terminated SCG #2 bearer as described above based on the bearer switching rule and bearer switching configuration information. In other words, the MN-terminated SCG #1 bearer or MN-terminated SCG #2 bearer may be selected as a bearer to which the MCG bearer is to be switched according to the bearer switching rule. The bearer switching configuration information may include priorities of bearers to be switched, and the MN-terminated SCG #2 bearer with the highest priority may be selected among the MN-terminated SCG #1 bearer and MN-terminated SCG #2 bearer. The MCG bearer may be switched to the MN-terminated SCG #2 bearer.

In step S730, the SDAP entity may re-establish QoS flow(s) mapped to the MCG bearer to the MN-terminated SCG #2 bearer. Then, in step S740, the SDAP entity may re-establish the bearers of the SN #2 associated with the MN-terminated SCG #2 bearer.

The UE may transmit QoS flow(s) to the SN #2 using the MN-terminated SCG #2 bearer. The SN #2 may receive the QoS flow(s) from the UE using the MN SCG #2 bearer. The SN #2 may forward the QoS flow(s) to the MN through an Xn interface. In addition, depending on the bearer switching configuration information, the SN #2 may directly transmit the QoS flow(s) to the CN without forwarding them to the MN.

In the fourth exemplary embodiment, the case where a UL coverage loss occurs on the MCG's Uu interface has been described, but exemplary embodiments are not limited thereto. Even when a UL coverage loss occurs on the Uu interface of the SCG #1 or SCG #2, the method described above in the fourth exemplary embodiment may be applied.

In the first to fourth exemplary embodiments, the case where a UL coverage loss occurs in the Uu interface of the MCG, SCG #1, or SCG #2 has been described, but exemplary embodiments are not limited thereto. Even when a DL coverage loss occurs, the method described above in the first to fourth exemplary embodiments may be applied.

Meanwhile, when the bearer switching procedure is performed, a DRB may be changed. Due to the change of the DRB, QoS flow(s) may be re-established. When the QoS flow(s) are re-established, the AN(s) may consider changing a PDU session and perform additional operations.

For example, if the DRB to be switched is not a split bearer, UP data may be delivered using a bearer of another AN. The another AN may transmit the received UP data directly to the CN without forwarding it to the AN which is a terminating point of the DRB to be switched.

The QoS flow may not be forwarded from an access network receiving the QoS flow to a source access network, but may be transmitted directly to the core network. If the same PDU session does not exist in a target access network, a PDU session may be selected in the target access network, and the QoS flow may be added to the selected PDU session. An N2 signaling procedure may be performed between the target access network and the core network. In the N2 signaling procedure, a command for adding the QoS flow may be included and the addition of the QoS flow may be performed.

The above-described bearer switching rules may be predefined or preconfigured. The UE may perform a bearer switching procedure according to the preconfigured bearer switching rules. The bearer switching configuration information may be configured in advance, and the bearer switching configuration information may include priority for each bearer. In other words, priorities for the respective bearers may be preconfigured.

The above-described UL coverage loss condition may be a preconfigured condition. UL_loss_indication has been described as being delivered to the SDAP entity in step S710, but exemplary embodiments are not limited thereto. UL_loss_indication may be indicated to a higher layer (e.g. application layer) of the UE.

Figure 8:
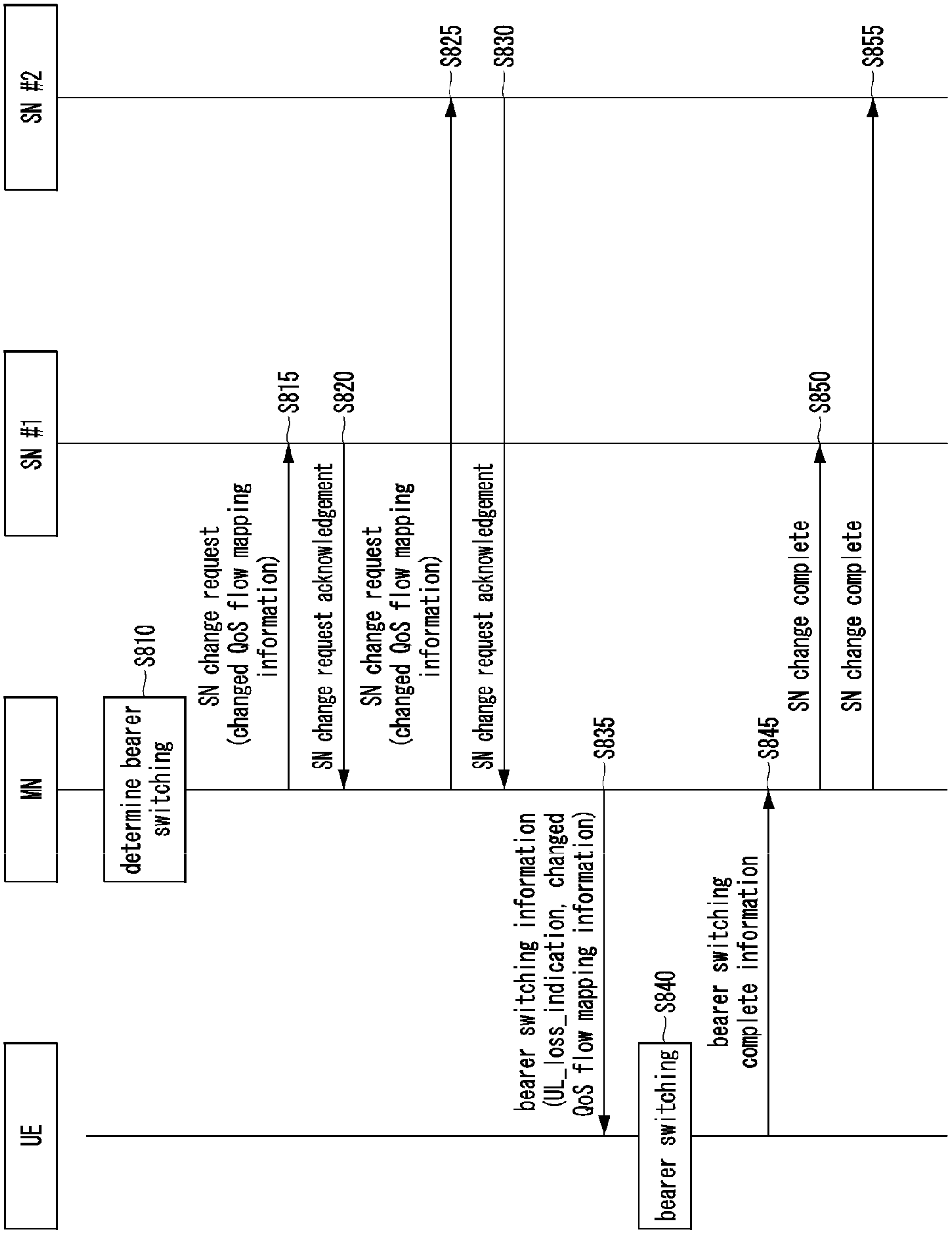
FIG. 8 is a sequence chart illustrating an exemplary embodiment of a bearer switching procedure initiated by an access node according to an exemplary embodiment of the present disclosure.

FIG. 8 is a sequence chart illustrating an exemplary embodiment of a bearer switching procedure initiated by an access node according to an exemplary embodiment of the present disclosure.

Referring to FIG. 8, the communication system may include the MN, SN #1, SN #2, and UE, and may support MR-MC. The MN, SN #1, SN #2, and UE may be configured identically or similarly to the communication node shown in FIG. 2. The MN may detect a connection loss in uplink and select a new DRB to move QoS flow(s) mapped to a previous DRB based on the bearer switching rule. Here, it may be assumed that the UE is connected to the MN, SN #1, and SN #2, and a PDU session is established between a CN and the UE. It may be assumed that UP data is transmitted and received between the MN and UE using one DRB. In the description of FIG. 8, bearer switching for one DRB is described for convenience of description, but multiple DRBs may exist. A bearer switching procedure is initiated by MN, but may also be initiated by SN #1 and/or SN #2.

In step S810, when the MN detects a uplink connection loss for the UE, the MN may select a new DRB according to the bearer switching rule as described above and initiate a bearer switching procedure. The new DRB may be a DRB to which QoS flow(s) mapped to the DRB that has lost uplink connectivity are to be moved with respect to the UE. Here, the uplink connection loss may be understood as a uplink coverage loss.

The bearer switching procedure is initiated by MN in step S810, but exemplary embodiments are not limited thereto. In other words, the SN #1 and/or SN #2 may each initiate the bearer switching procedure.

In steps S815 and S820, the MN may transmit a bearer switching request message indicating an SN change request command to the SN #1. The SN #1 may receive the SN change request command from the MN through the bearer switching request message (S815). The SN #1 may transmit a bearer switching request acknowledgement message indicating an SN change request acknowledgement response in response to the SN change request command, and the MN may receive the bearer switching request acknowledgement message indicating the SN change request acknowledgement response from the SN #1 (S820).

In steps S825 and S830, the MN may transmit a bearer switching request message indicating an SN change request command to the SN #2. The SN #2 may receive the SN change request command from the MN through the bearer switching request message (S825). The SN #2 may transmit a bearer switching request acknowledgement message indicating an SN change request acknowledgement response in response to the SN change request command, and the MN may receive the bearer switching request acknowledgement message indicating the SN change request acknowledgement response from the SN #2 (S830).

The MN may transmit the bearer switching request message including changed QoS flow matching information to SN #1 and SN #2, respectively, in steps S815 and S825. The changed QoS flow matching information may include elements such as {previous DRB, new DRB, QoS flow set}. Here, the previous DRB may indicate the bearer that is temporarily suspended due to lack of connectivity, and the QoS flow set may include at least one QoS flow to which the previous DRB is mapped. The new DRB may indicate the bearer to which the previous DRB is switched.

If the bearer switching succeeds by performing steps S815 to S830, the MN may perform step S835 to deliver a bearer switching result to the UE. If the bearer switching fails, a predefined procedure may be performed.

In step S835, the MN may transmit bearer switching information to the UE, and the UE may receive the bearer switching information from the MN. The bearer switching information may be included in an RRC reconfiguration message and transmitted from MN to UE.

The bearer switching information may include a bearer switching cause and changed QoS flow mapping information. The bearer switching cause may indicate a uplink coverage loss (e.g. UL_loss_indication) in step S835.

In step S840, the UE may perform bearer switching to the new DRB based on the bearer switching information received from the MN in step S835. When the bearer switching to the new DRB is performed, the UE may switch the previous DRB, which is to be temporarily suspended due to lack of connectivity, to the new DRB. When the new DRB is re-established, QoS flow(s) may be mapped to the new DRB based on the QoS flow set included in the changed QoS flow mapping information.

In step S845, the UE may transmit bearer switching complete information to the MN, and the MN may receive the bearer switching complete information from the UE. Here, the bearer switching complete information may include whether the bearer switching was successful. The bearer switching complete information may be included in an RRC reconfiguration complete message and transmitted from the MN to the UE.

If the bearer switching has been successfully performed, the UE may transition the uplink for which connectivity is lost to a suspended state after performing step S845. When the uplink transitions to the suspended state, the UE may reconfigure a power allocated to the uplink to a minimum value. If the bearer switching fails, the UE may perform a predefined procedure.

The MN may receive the bearer switching completion information from the UE in the step S845. When the bearer switching completion information is received, the MN may perform steps S850 and S860 to transmit SN change information to SN #1 and SN #2, respectively.

In steps S850 and S855, the MN may transmit a bearer switching complete message to SN #1 indicating an SN change complete report to SN #1. The SN #1 may receive the message from MN indicating the SN change complete report (S850). Then, the MN may transmit the bearer switching complete message to SN #2 indicating the SN change complete report to the SN #2. The SN #2 may receive the message from the MN indicating the SN change complete report (S855). The bearer switching complete message may include whether the UE's bearer switching result is successful or not.

In steps S850 and S855, the MN may transmit the bearer switching complete message indicating the SN change complete report to SN #1 and SN #2, respectively. The SN #1 and SN #2 may each receive the bearer switching complete message indicating the SN change complete report.

In the exemplary embodiment of FIG. 8, the case where a UL coverage loss occurs has been described, but exemplary embodiments are not limited thereto. Even when a DL coverage loss occurs in the Uu interface of the MCG, SCG #1, or SCG #2, the method described above in FIG. 8 may be applied.

The MN, SN #1, and SN #2 may be connected through ideal backhaul links or non-ideal backhaul links, and may exchange information with each other through ideal backhaul links or non-ideal backhaul links. In steps S815 to S830, the MN may transmit the SN change request command to SN #1 and SN #2 through Xn-C interfaces, and receive the SN change request acknowledgement response from SN #1 and SN #2. In steps S850 and S855, the MN may transmit the SN change complete report to SN #1 and SN #2 through Xn-C interfaces.

Figure 9:
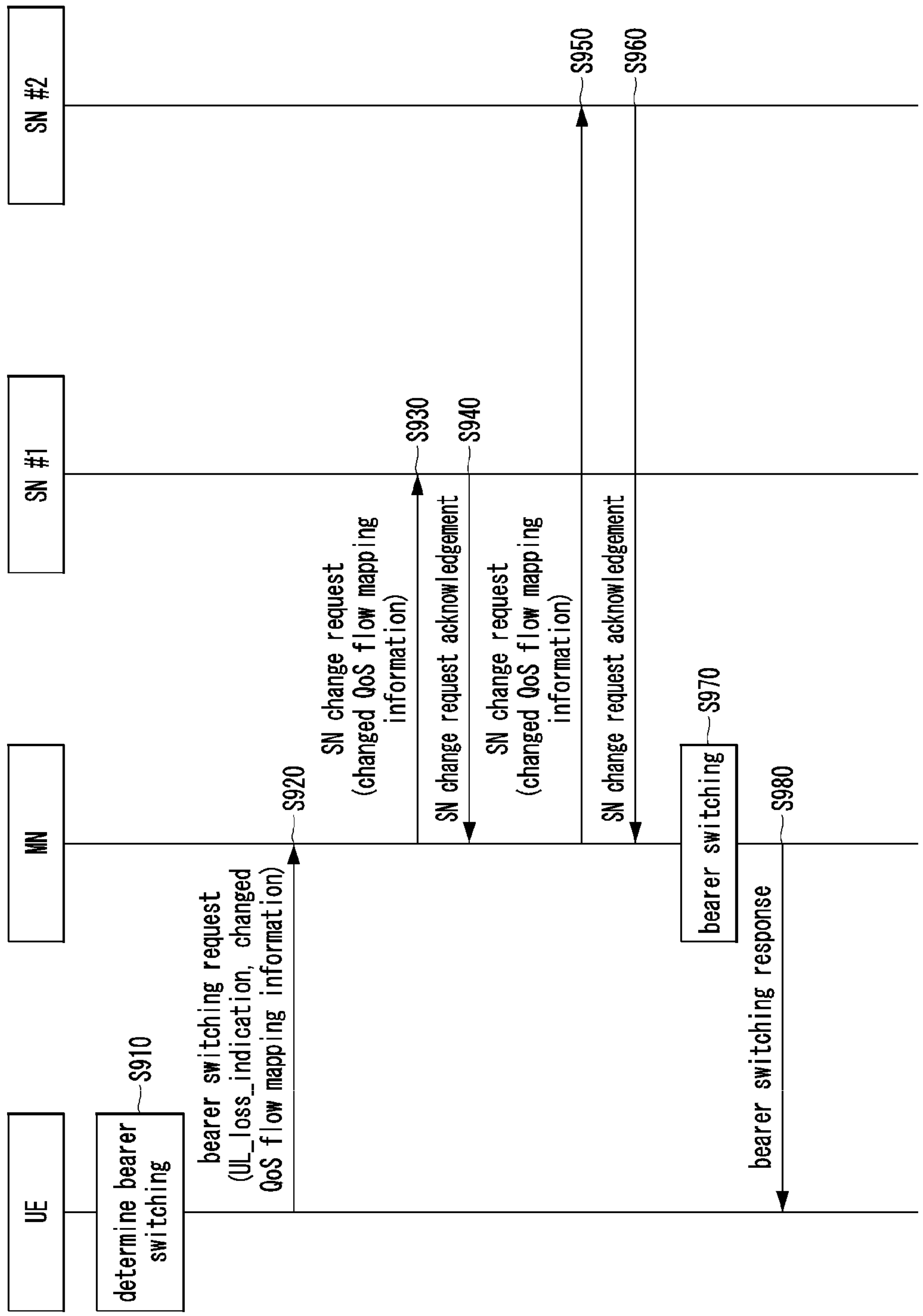
FIG. 9 is a sequence chart illustrating an exemplary embodiment of a bearer switching procedure initiated by a UE according to an exemplary embodiment of the present disclosure.

FIG. 9 is a sequence chart illustrating an exemplary embodiment of a bearer switching procedure initiated by a UE according to an exemplary embodiment of the present disclosure.

Referring to FIG. 9, the UE may be transmitting UP data to the MN and may be receiving UP data from the MN using a DRB (hereinafter referred to as 'first DRB'). A UL coverage loss may be detected in a connection between the MN and UE, and the UE may determine to switch the first DRB established between the UE and MN to a new DRB (hereinafter referred to as 'second DRB'). The UE may transmit a bearer switching request to the new DRB (i.e. second DRB) to the MN, and the MN may request bearer switching from SN #1 and SN #2 based on the received bearer switching request. The MN may transmit bearer switching results to the UE based on bearer switching responses received from SN #1 and SN #2. The UE may re-establish QoS flow(s) associated with the UP data to the second DRB based on the received bearer switching results and temporarily suspend transmission of UP data using the first DRB. The UP data may be transmitted and received using the second DRB. Here, it may be assumed that the UE is connected to the MN, SN #1, and SN #2 in MR-MC, and that a PDU session is established between the CN and the UE. In addition, it may be assumed that the DRB is established between the MN and UE. In the description of FIG. 9, bearer switching for one DRB is described for convenience of description, but multiple DRBs may exist. In addition, a UL coverage loss may occur in at least one of the connection between MN and UE, connection between SN #1 and UE, or connection between SN #1 and UE.

In FIG. 9, a procedure for recovering the first DRB is omitted for convenience of description, but the UE may further perform a procedure for recovering the temporarily suspended first DRB. The UE may perform the procedure for recovering the temporarily suspended first DRB based on bearer recovery configuration information. The recovered first DRB may be used for transmission and reception of UP data between the MN and UE.

In step S910, the UE may identify whether a UL coverage is lost in the connection between the MN and UE. When a UL coverage loss is identified, at least one DRB may be selected to move QoS flow(s) mapped to the first DRB based on the bearer switching rule. The UE may determine a second DRB for bearer switching among the at least one DRB based on bearer configuration information.

The UE may detect a UL coverage loss based on the UL coverage loss condition as in the DRB switching procedure for a UL coverage loss described in FIG. 7.

The bearer configuration information may include priority for each bearer as described above in the previous bearer switching rule. The UE may determine a DRB with the highest priority as the second DRB among the at least one DRB selected according to the priorities for the respective bearers included in the bearer configuration information.

If the UE identifies a UL coverage loss for the connection between the MN and UE in step S910, the UE may determine bearer switching to the second DRB. The UE may perform step S920 to switch the first DRB to the second DRB.

In the description of step S910, the same or similar description as the DRB switching procedure for a UL coverage loss may be omitted.

In step S920, the UE may transmit a bearer switching request command to the MN requesting bearer switching to the second DRB determined in the step S910. The MN may receive from the UE the bearer switching request command requesting bearer switching to the second DRB. The bearer switching request command may include a bearer switching cause and/or changed QoS flow mapping information. The changed QoS flow mapping information may include information elements (IEs) such as {previous DRB, new DRB, QoS flow set}. The previous DRB IE may including information on a bearer to be temporarily suspended due to lack of connectivity, and the new DRB IE may include information on a bearer to which the previous DRB is to be switched. The QoS flow set IE may include information on at least one QoS flow re-established to the switched bearer. The IE may be expressed as information.

The UE may transmit the bearer switching request command to the MN requesting switching from the first DRB to the second DRB in step S920. In the bearer switching request command, the bearer switching cause may indicate a UL coverage loss (e.g. UL_loss_indication), the previous DRB IE may indicate the first DRB, and the new DRB IE may indicate the second DRB. The QoS flow set IE may include information on at least one QoS flow mapped to the first DRB.

In steps S930 to S960, the MN may transmit a bearer switching request message indicating an SN change request to each of SN #1 and SN #2 based on the bearer switching request command received from the UE in step S920. The SN #1 and SN #2 may each receive the SN change request command from the MN through the bearer switching request message (S930, S950). Each of SN #1 and SN #2 may transmit a bearer switching request acknowledgement message indicating an SN change request acknowledgement response to the SN change request command, and the MN may receive the bearer switching request acknowledgement message indicating the SN change request acknowledgement response from each of SN #1 and SN #2 (S940, S960).

In step S970, the MN may perform a bearer switching procedure based on the bearer switching request command received from the UE in step S920. When the bearer switching procedure is completed, the MN may perform step S980.

In step S980, the MN may transmit a bearer switching response including a bearer switching result to the UE, and the UE may receive the bearer switching response.

The UE may identify whether the bearer switching succeeds based on the bearer switching response received in step S980. If the bearer switching is identified to be successful, the UE may re-establish at least one flow mapped to the first DRB to the second DRB. The UE may temporarily suspend transmission of UP data using the first DRB, and transition the state of the first DRB from the RB_connected state to the RB_suspended state. The UE may transmit and receive UP data using the second DRB.

In the exemplary embodiment of FIG. 9, the case where a UL coverage loss occurs has been described, but exemplary embodiments are not limited thereto. Even when a DL coverage loss occurs in the Uu interface of the MCG, SCG #1, or SCG #2, the method described above in FIG. 9 may be applied.

Meanwhile, when the first DRB is in the RB_suspended state, the UE may reconfigure a power allocated to the MN to be minimized.

In an exemplary embodiment, the MN may include the bearer switching response in suspension configuration information (e.g. suspendConfig), and transmit an RRC connection release message (e.g. RRCRelease message) including the suspension configuration information to the UE.

In an exemplary embodiment, the UE may receive the RRC connection release message including the suspension configuration information received from the MN. The UE may transition an RRC connection state between the MN and the UE to the RRC inactive state.

When the RRC connection between the MN and the UE is in the RRC inactive state, the UE may configure a power consumed for connection with the MN to be minimized.

In another exemplary embodiment, the MN may include the bearer switching response in discontinuous reception (DRX) configuration information (e.g. DRX-Config), and transmit an RRC connection release message including the DRX configuration information to the UE.

In another exemplary embodiment, the UE may receive the RRC connection release message including the DRX configuration information received from the MN. The UE may operate in a DRX mode (e.g. C-DRX mode) in the RRC connected state between the MN and the UE. The UE may be configure a power consumed for connection with the MN to be minimized.

Meanwhile, the UE may further perform a procedure for recovering the temporarily suspended first DRB. The UE may perform the procedure for recovering the temporarily suspended first DRB based on bearer recovery configuration information. The recovered first DRB may be used for transmission and reception of UP data between the MN and UE.

[Method for Managing a Split Bearer in MR-MC]

The MR-MC architecture may require complex bearer management compared to a standalone architecture. In addition, the MR-MC architecture may require a relatively complex bearer structure compared to the MR-DC architecture.

Figure 10:
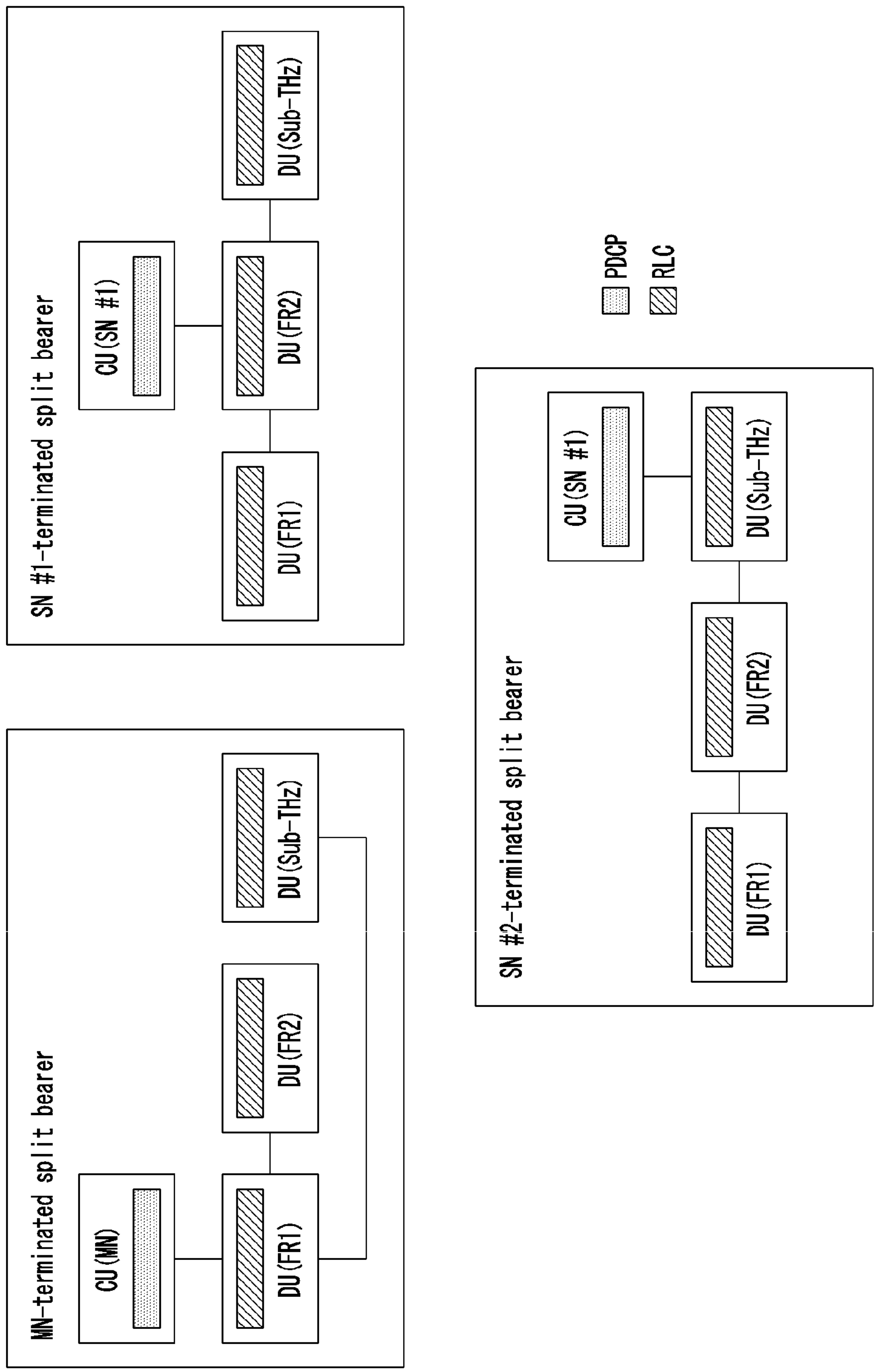
FIG. 10 is a conceptual diagram illustrating an exemplary embodiment of a split bearer management method in MR-MC according to an exemplary embodiment of the present disclosure.

FIG. 10 is a conceptual diagram illustrating an exemplary embodiment of a split bearer management method in MR-MC according to an exemplary embodiment of the present disclosure.

Referring to FIG. 10, the communication system may include the MN, SN #1, and SN #2, and may support MR-MC. The MN, SN #1, and SN #2 may each use different frequency bands. An F1 band may be allocated to and used by MN, and a F2 band may be allocated to and used by SN #1. In addition, a sub-THz band may be allocated to and used by SN #2. In MR-MC, a split bearer may be a bearer with a multi-RLC, and a PDCP entity associated with the split bearer may be associated with at least three RLC entities. Here, a split bearer may be classified into an MN-terminated split bearer, SN #1-terminated split bearer, or SN #2-terminated split bearer.

Referring to FIG. 10, each of the MN, SN #1, and SN #2 may be functionally split into a central unit (CU) and distributed unit (DU). The CU may include an RRC layer, SDAP layer, and PDCP layer, and the DU may include an RLC layer, MAC layer, and PHY layer. The CU and DU may be connected to each other through an ideal backhaul link or non-ideal backhaul link, and may exchange information with each other through the ideal backhaul link or non-ideal backhaul link. The CU may be connected to the core network through an ideal backhaul link or non-ideal backhaul link. Each of the CU and DU may be configured identically or similarly to the communication node shown in FIG. 2. In FIG. 10, one DU is shown for convenience of description, but each of the MN, SN #1, and SN #2 may include at least one DU.

In MR-MC, a split bearer may be a split bearer with multiple RLCs and may be classified into an MN-terminated split bearer, SN #1-terminated split bearer, and SN #2-terminated split bearer. The split bearer may be associated with a PDCP entity, and the PDCP entity may be associated with at least three RLC entities. In MR-MC, split bearers may be managed using the following methods.

- Bearer establishment may be performed through a signaling procedure of a higher layer (e.g. RRC signaling procedure).
- The PDCP entity associated with the split bearer may perform state management (activation/deactivation) of the RLC entities.
- Each of the MN, SN #1 and SN # may share a rule for correspondence between QoS flows and radio bearers in advance, and perform a signaling procedure therefor.
- The PDCP entity associated with a transmitting split bearer may route PDCP packets to an activated or pre-configured RLC entity.

Meanwhile, an upper layer (e.g. SDAP layer) of the PDCP associated with a receiving split bearer may route a QoS flow to an AN appropriate for a destination. Here, the AN may mean the MN, SN #1, or SN #2

The PDCP entity associated with split bearers (e.g. MN-terminated split bearer, SN #1-terminated split bearer, SN #2-terminated split bearer) may be associated with one primary RLC entity and at least two secondary RLC entities.

A transmitting SDAP entity for non-split bearers may perform routing from the SDAP entity to the PDCP entities by considering a connection state for each band.

A transmission PDCP entity for split bearers may perform routing to the RLC entities considering a connection state for each band.

Figure 11:
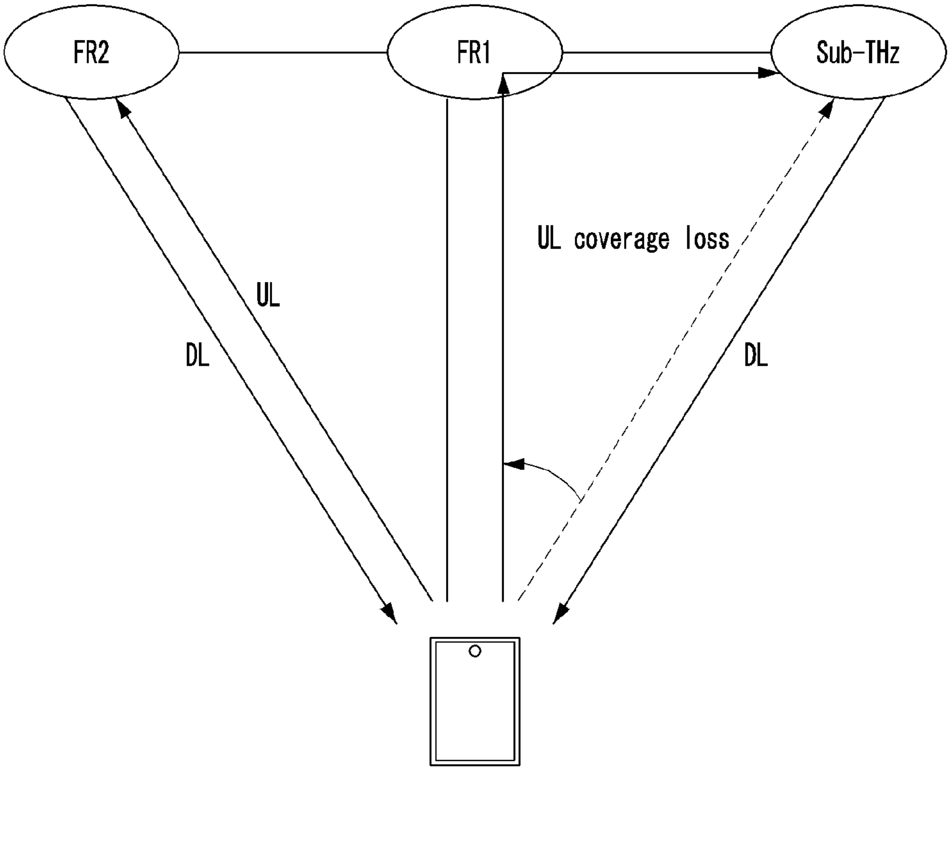
FIG. 11 is a conceptual diagram illustrating an exemplary embodiment of connection transfer in MR-MC for a UL coverage loss according to an exemplary embodiment of the present disclosure.

FIG. 11 is a conceptual diagram illustrating an exemplary embodiment of connection transfer in MR-MC for a UL coverage loss according to an exemplary embodiment of the present disclosure.

Referring to FIG. 11, the communication system may include the MN, SN #1, and SN #2, and may support MR-MC. The MN, SN #1, and SN #2 may use different frequency bands, respectively. An F1 band may be allocated to and used by MN, a sub-THz band may be allocated to and used by SN #1. An F2 band may be allocated to and used by SN #2. The UE may transmit and receive first UP data through an MCG bearer, and transmit and receive second UP data through an SCG #1 bearer. In MR-MC, when a UL coverage loss is identified in one connection, the UE may move radio bearer(s) corresponding to the UL coverage loss to another connection in the MR-MC.

Figure 12:
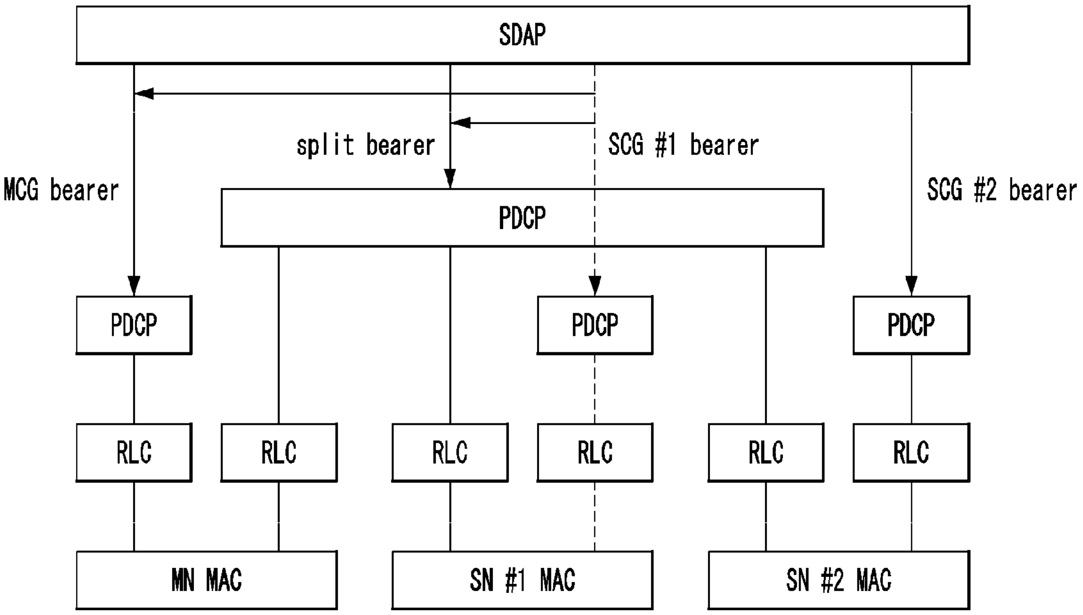
FIG. 12 is a conceptual diagram illustrating an exemplary embodiment of bearer switching related to a UL coverage loss according to an exemplary embodiment of the present disclosure.

FIG. 12 is a conceptual diagram illustrating an exemplary embodiment of bearer switching related to a UL coverage loss according to an exemplary embodiment of the present disclosure.

Referring to FIG. 12, the communication system may include the MN, SN #1, and SN #2, and may support MR-MC. The MN, SN #1, and SN #2 may use different frequency bands, respectively. An F1 band may be allocated to and used by MN, a sub-THz band may be allocated to and used by SN #1. An F2 band may be allocated to and used by SN #2. The UE may transmit and receive first UP data through an MCG bearer, and transmit and receive second UP data through an SCG #1 bearer. When a UL coverage loss occurs, a bearer where the UL coverage loss occurs may be switched to another bearer.

The UE may identify whether a UL coverage is lost on an interface of SCG #1. If an UL coverage loss is identified on the interface of SCG #1, the UE may switch the SCG #1 bearer to a split bearer terminated at the SN #1 (i.e. SN #1-terminated split bearer). A transmitting PDCP entity for split bearers may perform routing to RLC entities considering a connection state for each band. In addition, the UE may switch the SCG #1 bearer to an MCG bearer terminated at the SN #1 (i.e. SN #1-terminated MCG bearer). A transmitting SDAP entity for non-split bearers may perform routing from the SDAP to PDCP entities considering a connection state for each band.

Figure 13A:
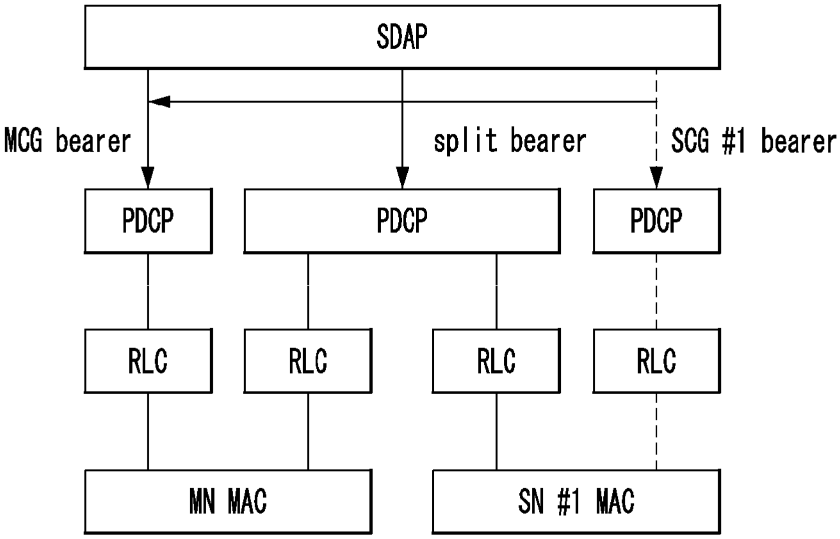
FIG. 13A is a conceptual diagram illustrating an exemplary embodiment of non-split bearer switching in MR-MC for an uplink coverage loss according to an exemplary embodiment of the present disclosure.
Figure 13B:
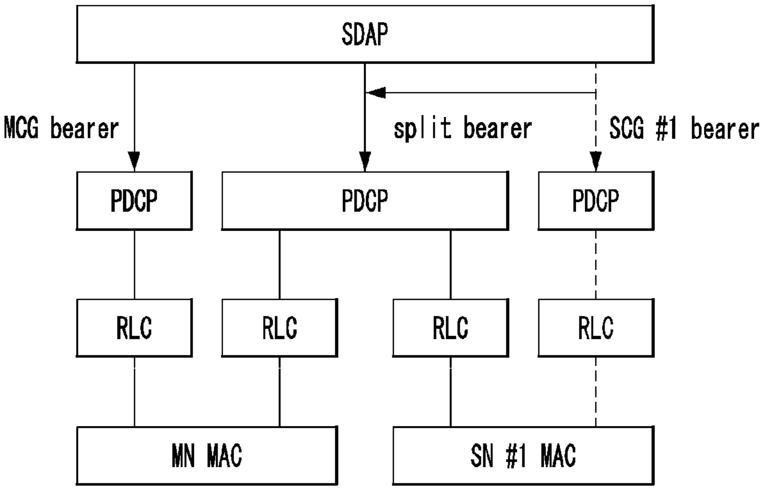
FIG. 13B is a conceptual diagram illustrating an exemplary embodiment of split bearer switching in MR-MC for an uplink coverage loss according to an exemplary embodiment of the present disclosure.

FIG. 13A is a conceptual diagram illustrating an exemplary embodiment of non-split bearer switching in MR-MC for an uplink coverage loss according to an exemplary embodiment of the present disclosure, and FIG. 13B is a conceptual diagram illustrating an exemplary embodiment of split bearer switching in MR-MC for an uplink coverage loss according to an exemplary embodiment of the present disclosure.

Referring to FIGS. 13A and 13B, the communication system may include the MN, SN #1, and UE, and may support MR-MC. The MN and SN #1 may use different frequency bands. When a UL coverage loss occurs, a bearer where the UL coverage loss occurs may be switched to another bearer.

If the UL coverage loss occurs on an SCG Uu interface in MR-MC, a bearer related to the UL coverage loss may be switched to a split bearer (e.g. MN-terminated split bearer) or a bearer of another cell group (e.g. MN-terminated MCG bearer). For example, if the switched bearer is an MN-terminated split bearer, a transmitting PDCP entity for split bearers may not perform routing to RLC entities in a band where the UL coverage loss occurs.

The exemplary embodiment of split bearer management in MR-MC has been described for the case where a UL coverage loss occurs, but exemplary embodiments are not limited thereto. Even when a DL coverage loss occurs on a Uu interface of the MCG, SCG #1, or SCG #2, the split bearer management method described above in MR-MC may be applied.

[Bearer Switching Procedure According to a Bearer Type in MR-MC]

In MR-MC, when a UL coverage loss occurs in one connection, a protocol layer (e.g. RRC layer, MAC layer) may notify it to an SDAP layer. An SDAP entity belonging to the SDAP layer may temporarily change a state of DRB(s) corresponding to a UL where the UL coverage loss occurs to the suspended state.

In an exemplary embodiment, the state of the DRB(s) corresponding to the UL where the UL coverage loss occurs may be changed through an RRC reconfiguration procedure. The SDAP entity may temporarily transition the DRB(s) into the suspended state.

In another exemplary embodiment, when a UL coverage loss occurs in one connection, an upper layer (e.g. RRC layer) may transmit an indicator requesting a change in the state of the DRB(s) corresponding to the UL coverage loss to the SDAP entity. Thereafter, the SDAP entity may transition the corresponding DRB(s) to a temporarily suspended state.

Figure 14A:
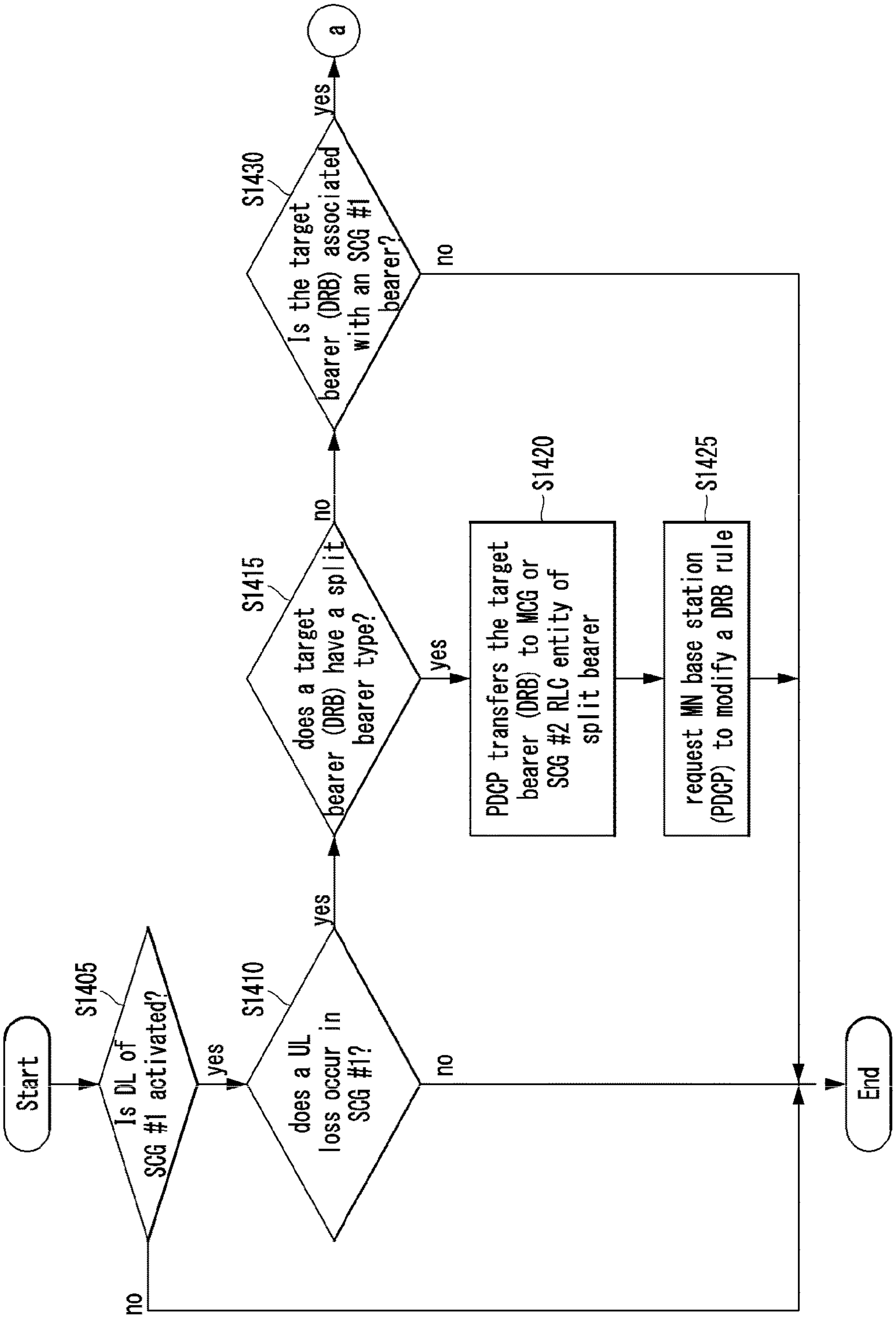
FIG. 14A is a flowchart illustrating a first process of a bearer switching procedure based on a bearer type according to an exemplary embodiment of the present disclosure.
Figure 14B:
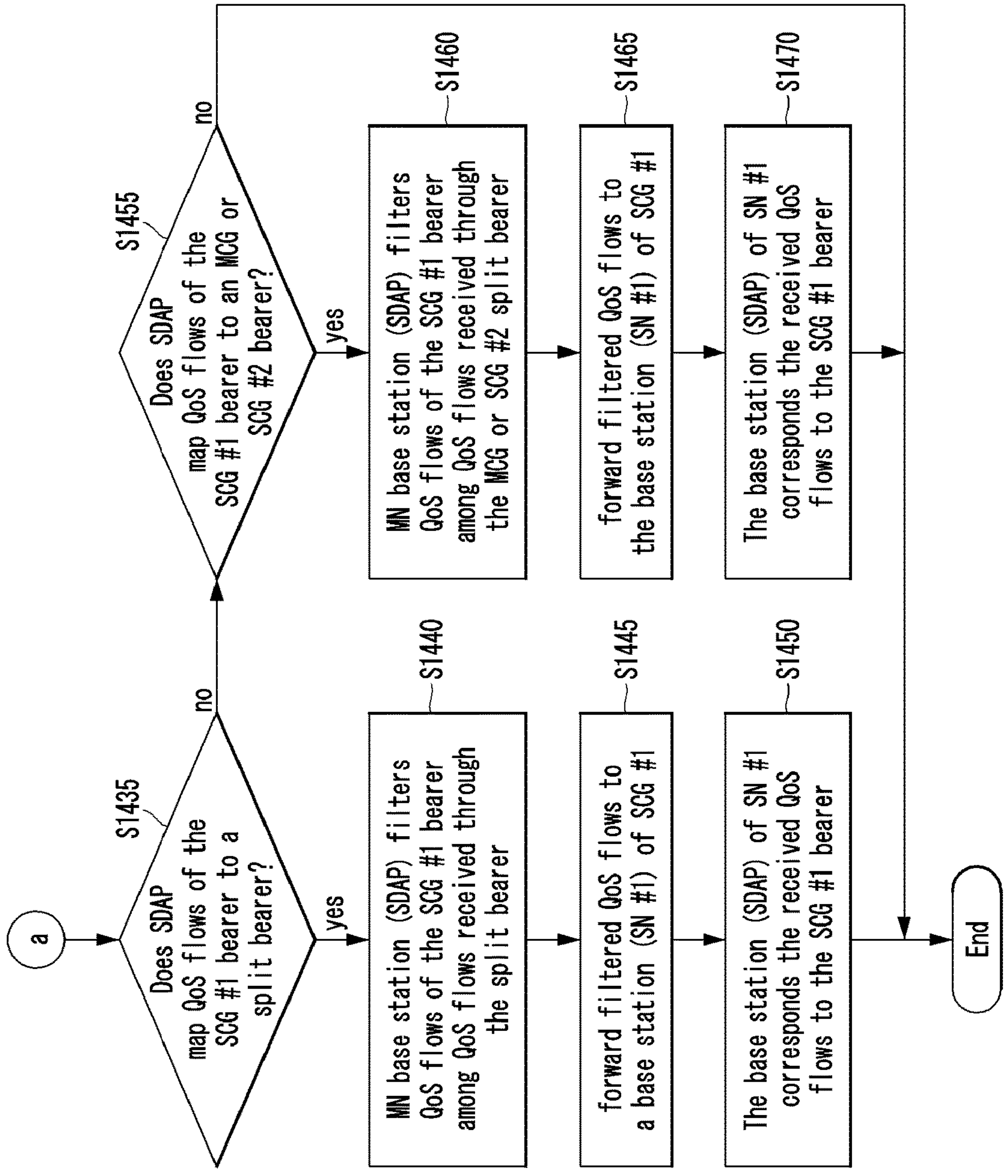
FIG. 14B is a flowchart illustrating a second process of a bearer switching procedure based on a bearer type according to an exemplary embodiment of the present disclosure.

FIG. 14A is a flowchart illustrating a first process of a bearer switching procedure based on a bearer type according to an exemplary embodiment of the present disclosure, and FIG. 14B is a flowchart illustrating a second process of a bearer switching procedure based on a bearer type according to an exemplary embodiment of the present disclosure.

Referring to FIGS. 14A and 14B, the communication system may include the MN, SN #1, SN #2, and UE, and may support MR-MC. The MN, SN #1, SN #2, and UE may be configured identically or similarly to the communication node shown in FIG. 2. When a UL coverage loss is identified, a bearer switching procedure may be performed. The UE may be assumed to be connected to each of MN, SN #1, and SN #2 based on MR-MC configuration. Here, the MR-MC configuration may be configured in advance to the UE.

In steps S1405 and S14010, the UE may identify whether a DL is activated in the SCG #1 (S1405). If DL activation is identified in the SCG #1, the UE may identify whether a UL coverage is lost in the SCG #1 (S1410). If the UL coverage loss is identified, the UE may perform step S1415.

In step S1415, the UE may identify whether a target bearer (DRB) has a split bearer type. If it is identified that the target bearer (DRB) has a split bearer type, the UE may perform steps S1420 and S1425. If it is not identified that the target bearer (DRB) has a split bearer type, step S1430 may be performed.

In steps S1420 and S1425, the UE may transfer the corresponding DRB to the MCG or SCG #2 RLC entity of the split bearer (S1420). The UE may request the MN (or MN base station) to modify a DRB rule (S1425).

The steps S1420 and S1425 may be performed by the UE's PDCP entity. In step S1425, the MN (or MN base station) may be a PDCP entity of the MN (or MN base station).

In step S1430, the UE may identify whether the target bearer (DRB) is associated with an SCG #1 bearer. If it is identified that the target bearer (DRB) is associated with the SCG #1 bearer, the UE may perform step S1435.

In step S1435, the UE may identify whether the SDAP entity maps a QoS flow of the corresponding SCG #1 bearer to a split bearer. If it is identified that the SDAP entity maps a QoS flow of the corresponding SCG #1 bearer to a split bearer, the UE may perform steps S1440 to S1450. Otherwise, the UE may perform step S1455.

In steps S1440 to S1450, the MN (or MN base station) may filter QoS flow(s) of the SCG #1 bearer among QoS flows received through the split bearer (S1440), and forward them to a base station (SN #1) of the SCG #1 (S1445). The base station of SN #1 may correspond the received QoS flows to the SCG #1 bearer (S1450).

The steps S1440 and S1445 may be performed by the SDAP entity of the MN (or MN base station), and the step S1450 may be performed by the SDAP entity of SN #1.

In step S1455, the UE may identify whether the SDAP entity maps a QoS flow of the corresponding SCG #1 bearer to an MCG or SCG #2 bearer. If it is identified that a QoS flow of the corresponding SCG #1 bearer is mapped to a split bearer, steps S1460 to S1470 may be performed.

In steps S1460 to S1470, the MN (or MN base station) may filter QoS flows of the SCG #1 bearer among QoS flows received through the MCG or SCG #2 bearer, and forward them to the base station (SN #1) of the SCG #1 (S1465). The base station of SN #1 may correspond the received QoS flows to the SCG #1 bearer (S1470).

The steps S1460 and S1465 may be performed by the SDAP entity of the MN (or MN base station). The step S1470 may be performed by the SDAP entity of SN #1.

The exemplary embodiment of the bearer switching procedure according to the bearer type in MR-MC has been described for the case where a UL coverage loss occurs, but exemplary embodiments are not limited thereto. Even when a DL coverage loss occurs on a Uu interface of the MCG, SCG #1, or SCG #2, the bearer switching procedure according to the bearer type described above may be applied.

In the present disclosure, a bearer structure for MR-MC may be defined, and a matching rule for QoS flows may be defined. Further, the present disclosure may propose a bearer management method based on the newly defined bearer structure for MR-MC and the matching rule for QoS flows. The proposed bearer management method may efficiently handle frequent uplink or downlink coverage losses in an edge section of a high frequency band such as a sub-THz band.

The MR-MC architecture may require complex bearer management compared to a standalone architecture. In addition, the MR-MC architecture may require a relatively complex bearer structure compared to the MR-DC architecture.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:

transmitting user plane (UP) data to at least one node among a master node (MN) or a second secondary node (SN) through a first data radio bearer (DRB);

in response to identifying an uplink (UL) coverage loss in the second SN, determining switching from the first DRB to a second DRB based on a bearer switching rule;

transmitting a request for bearer switching to the second DRB to the MN;

receiving a response for the bearer switching to the second DRB from the MN;

identifying whether a bearer switching result included in the response of bearer switching indicates success or failure;

in response to identifying that the bearer switching result indicates the success, temporarily suspending the first DRB; and transmitting the UP data to at least one node among the MN or a first SN through the second DRB, wherein each of the first DRB and the second DRB is configured as one of: a master cell group (MCG) bearer; a first secondary cell group (SCG) bearer; a second SCG bearer; or a split bearer;

wherein the MCG bearer, the first SCG bearer, and the second SCG bearer are classified as non-split bearers;

wherein the MCG bearer uses radio resources of the MN, the first SCG bearer uses radio resources of the first SN, the second SCG bearer uses radio resources of the second SN, and the split bearer uses all of the radio resources of the MN, the radio resources of the first SN, and the radio resources of the second SN; and wherein the radio resources of the MN, the radio resources of the first SN, and the radio resources of the second SN belong to different frequency bands.

2. The method according to claim 1, wherein, when each of the first DRB and the second DRB is configured as the split bearer, the split bearer includes a bearer of the first SCG terminated at the MN, a bearer of the second SCG terminated at the MN, a bearer of the MCG terminated at the first SN, a bearer of the second SCG terminated at the first SN, a bearer of the MCG terminated at the second SN, or a bearer of the first SCG terminated at the second SN.

3. The method according to claim 1, wherein the bearer switching rule is a switching rule for split bearers, and when the UL coverage loss is identified, the terminal selects a split bearer having a same terminating point as the first DRB among the split bearers, and determines the selected split bearer as the second DRB to which the first DRB is to be switched.

4. The method according to claim 1, wherein the bearer switching rule is a switching rule for split bearers, and when the UL coverage loss is identified, the terminal selects a split bearer having a different terminating point from the first DRB among the split bearers, and determines the selected split bearer as the second DRB to which the first DRB is to be switched.

5. The method according to claim 1, wherein the bearer switching rule is a switching rule for non-split bearers, and when the UL coverage loss is identified, the terminal selects one bearer that is different from the first DRB and is connected to uplink among the non-split bearers, and determines the selected one bearer as the second DRB to which the first DRB is to be switched.

6. The method according to claim 1, wherein the request for bearer switching includes at least one of cause information, information on a DRB to be suspended, information on a DRB to be switched, or information on at least one QoS flow mapped to the DRB to be suspended, the cause information indicates the UL coverage loss, the information on the DRB to be suspended is information on the first DRB, the information on the DRB to be switched is information on the second DRB, and the information on the at least one QoS flow is information of at least one QoS flow mapped to the first DRB.

7. The method according to claim 1, wherein the temporarily suspending of the first DRB further comprises: re-establishing at least one QoS mapped to the first DRB to the second DRB.

8. The method according to claim 1, further comprising: in response to identifying the bearer switching from the first DRB to the second DRB for the UP data, reconfiguring a power allocated to UL transmission of the second SN.

9. The method according to claim 1, further comprising: in response to satisfying a predefined bearer recovery condition for the first DRB, performing a bearer recovery procedure to recover the first DRB.

10. The method according to claim 1, further comprising: in response to the bearer switching result indicating the failure, performing a predefined bearer switching failure procedure, and the predefined bearer switching failure procedure further includes a single connectivity establishment procedure.

11. A terminal comprising: at least one processor, wherein the at least one processor causes the terminal to perform:

transmitting user plane (UP) data to at least one node among a master node (MN) or a second secondary node (SN) through a first data radio bearer (DRB);

in response to identifying an uplink (UL) coverage loss in the second SN, determining switching from the first DRB to a second DRB based on a bearer switching rule;

transmitting a request for bearer switching to the second DRB to the MN;

receiving a response for the bearer switching to the second DRB from the MN;

identifying whether a bearer switching result included in the response of bearer switching indicates success or failure;

in response to identifying that the bearer switching result indicates the success, temporarily suspending the first DRB; and transmitting the UP data to at least one node among the MN or a first SN through the second DRB, wherein each of the first DRB and the second DRB is configured as one of: a master cell group (MCG) bearer; a first secondary cell group (SCG) bearer; a second SCG bearer; or a split bearer;

wherein the MCG bearer, the first SCG bearer, and the second SCG bearer are classified as non-split bearers;

wherein the MCG bearer uses radio resources of the MN, the first SCG bearer uses radio resources of the first SN, the second SCG bearer uses radio resources of the second SN, and the split bearer uses all of the radio resources of the MN, the radio resources of the first SN, and the radio resources of the second SN; and wherein the radio resources of the MN, the radio resources of the first SN, and the radio resources of the second SN belong to different frequency bands.

12. The terminal according to claim 11, wherein, when each of the first DRB and the second DRB is configured as the split bearer, the split bearer includes a bearer of the first SCG terminated at the MN, a bearer of the second SCG terminated at the MN, a bearer of the MCG terminated at the first SN, a bearer of the second SCG terminated at the first SN, a bearer of the MCG terminated at the second SN, or a bearer of the first SCG terminated at the second SN.

* * * * *